US012764094B2

(12) United States Patent
Parla et al.

(10) Patent No.: US 12,764,094 B2
(45) Date of Patent: Oct. 13, 2026

(54) DETERMINING SECURITY ACTIONS AT POLICY-ENFORCEMENT POINTS USING METADATA REPRESENTING A SECURITY CHAIN FOR A DATA FLOW

(71) Applicant: Cisco Technology, Inc., San Jose, CA (US)

(72) Inventors: Vincent Parla, North Hampton, NH (US); Kyle Andrew Donald Mestery, Woodbury, MN (US); Stephen Craig Connors, Jr., Nashville, TN (US)

(73) Assignee: Cisco Technology, Inc., San Jose, CA (US)

( * ) Notice: Subject to any disclaimer, the term of this patent is extended or adjusted under 35 U.S.C. 154(b) by 30 days.

(21) Appl. No.: 18/779,939

(22) Filed: Jul. 22, 2024

(65) Prior Publication Data

US 2025/0039135 A1 Jan. 30, 2025

Related U.S. Application Data

(60) Provisional application No. 63/516,448, filed on Jul. 28, 2023.

(51) Int. Cl.
*H04L 9/40* (2022.01)
*H04L 9/32* (2006.01)
(Continued)

(52) U.S. Cl.
CPC ........ *H04L 63/0236* (2013.01); *H04L 9/3247* (2013.01); *H04L 41/0806* (2013.01);
(Continued)

(58) Field of Classification Search
None
See application file for complete search history.

(56) References Cited

U.S. PATENT DOCUMENTS 12,212,568 B1 * 1/2025 Chandrashekar ....... H04L 63/10
2014/0208413 A1 * 7/2014 Grobman ............ H04L 63/0245 726/14
(Continued)

FOREIGN PATENT DOCUMENTS

WO 2013124758 A1 8/2013

OTHER PUBLICATIONS

International Search Report and Written Opinion for International Application No. PCT/US2024/040049, mailed Sep. 25, 2024, 15 Pages.

*Primary Examiner* — Scott B Christensen
(74) *Attorney, Agent, or Firm* — Polsinelli P.C.

(57) ABSTRACT

A system and method are provided that use metadata encoded in a data flow to determine security actions to perform at a policy-enforcement point based on the security-chain context for the data flow that is provided by metadata (e.g., the security-chain context can include which security operations have been performed upstream on which data packets). The policy-enforcement point receives the data flow and the metadata, including attestations of the security operations that have previously (e.g., upstream) been applied to the data flow. Based on the attested to security operations, the policy-enforcement point selects what security actions to apply next to the data flow, e.g., additional security operations to apply, allow the data flow into a workload or trust zone, drop the workload, perform dynamic load balancing.

20 Claims, 15 Drawing Sheets

(51) Int. Cl.

| | |
|---|---|
| ***H04L 41/0806*** | (2022.01) |
| ***H04L 41/0816*** | (2022.01) |
| ***H04L 41/082*** | (2022.01) |
| ***H04L 41/0869*** | (2022.01) |
| ***H04L 41/0895*** | (2022.01) |
| ***H04L 43/50*** | (2022.01) |
| ***H04L 45/24*** | (2022.01) |
| ***H04L 45/80*** | (2022.01) |

(52) U.S. Cl.

CPC ........ *H04L 41/0816* (2013.01); *H04L 41/082* (2013.01); *H04L 41/0869* (2013.01); *H04L 41/0895* (2022.05); *H04L 43/50* (2013.01); *H04L 45/24* (2013.01); *H04L 45/80* (2022.05); *H04L 63/0218* (2013.01); *H04L 63/0263* (2013.01); *H04L 63/0435* (2013.01); *H04L 63/123* (2013.01); *H04L 63/1425* (2013.01); *H04L 63/1433* (2013.01); *H04L 63/145* (2013.01); *H04L 63/166* (2013.01); *H04L 63/20* (2013.01)

(56) References Cited

U.S. PATENT DOCUMENTS

| | | | | |
|---|---|---|---|---|
| 2014/0362857 | A1* | 12/2014 | Guichard | H04L 45/306 370/392 |
| 2016/0248685 | A1 | 8/2016 | Pignataro et al. | |
| 2018/0069836 | A1* | 3/2018 | Mandyam | H04L 63/0281 |
| 2019/0140983 | A1 | 5/2019 | Tu et al. | |
| 2019/0173841 | A1 | 6/2019 | Wang et al. | |
| 2019/0199533 | A1* | 6/2019 | Boutnaru | H04L 9/0643 |
| 2020/0322145 | A1* | 10/2020 | Sheth | H04L 9/3247 |
| 2020/0322150 | A1* | 10/2020 | Psenak | H04L 9/3213 |
| 2020/0322353 | A1* | 10/2020 | Bhandari | H04L 63/1425 |
| 2020/0322383 | A1* | 10/2020 | Filsfils | H04L 63/20 |
| 2021/0144075 | A1 | 5/2021 | Indiresan et al. | |
| 2021/0409404 | A1* | 12/2021 | Brossard | H04L 63/126 |
| 2022/0321362 | A1* | 10/2022 | Konda | G06F 21/57 |
| 2023/0027516 | A1 | 1/2023 | Kantecki et al. | |
| 2023/0109396 | A1 | 4/2023 | Jain et al. | |
| 2023/0188561 | A1 | 6/2023 | Finkelshtien et al. | |
| 2023/0216829 | A1 | 7/2023 | Jain et al. | |

* cited by examiner

| Order | Header Type | Next Header Code |
|---|---|---|
| 1 | Basic IPv6 Header | - |
| 2 | Hop-by-Hop Options | 0 |
| 3 | Destination Options (with Routing Options) | 60 |
| 4 | Routing Header | 43 |
| 5 | Fragment Header | 44 |
| 6 | Authentication Header | 51 |
| 7 | Encapsulation Security Payload Header | 50 |
| 8 | Destination Options | 60 |
| 9 | Mobility Header | 135 |
| | No next header | 59 |
| Upper Layer | TCP | 6 |
| Upper Layer | UDP | 17 |
| Upper Layer | ICMPv6 | 58 |

FIG. 9C

DETERMINING SECURITY ACTIONS AT POLICY-ENFORCEMENT POINTS USING METADATA REPRESENTING A SECURITY CHAIN FOR A DATA FLOW

CROSS-REFERENCE TO RELATED APPLICATIONS

This application priority to U.S. provisional application No. 63/516,448, titled "Data Processing Units (DPUs) and extended Berkley Packet Filters (eBPFs) for Improved Security," and filed on Jul. 28, 2023, which is expressly incorporated by reference herein in its entirety.

FIELD

Aspects described herein generally relate to determining security actions at a policy-enforcement point based on metadata that includes attestations of which security operations have been previously performed on the data flow, and, more specifically, aspects relate to using extended Berkley packet filters (eBPFs) and/or data processing units (DPUs) as the policy-enforcement points.

BACKGROUND

A perimeter firewall is a network security system that monitors and controls incoming and outgoing network traffic based on predetermined security rules. A perimeter firewall can establish a barrier between a trusted and untrusted networks. A single point of protection against malicious software is not necessarily optimal and is not always feasible.

A distributed firewall can be used to augment and/or supplement a traditional single-point firewall. A distributed firewall can include a security application on a host machine of a network that protects the servers and user machines of its enterprise's networks against unwanted intrusion. A firewall is a system or group of systems (router, proxy, or gateway) that implements a set of security rules to enforce access control between two networks to protect the trusted network from the untrusted network. The system or group of systems filter all traffic regardless of its origin—the Internet or the internal network. The distributed firewall can be deployed behind a perimeter firewall to provide a second layer of defense.

Traffic can take different routes through a network, and, in a distributed security fabric such as a distributed firewall, different security operations can be performed at different nodes or policy-enforcement points within the network, such that different routes through the network can also result in different data packets arriving at a workload having undergone different security operations. For example, east-west traffic might have undergone different security operations than north-south traffic. Further, different data packets traversing the same route might not be treated uniformly, such that different data packets traversing the route have undergone different security operations.

Improved systems and methods are desired for differentiating which data packets have undergone different security operations.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 9C illustrates an example of header types for optional IPv6 extension headers, in accordance with some embodiments.

DESCRIPTION OF EXAMPLE EMBODIMENTS

Figure 1:
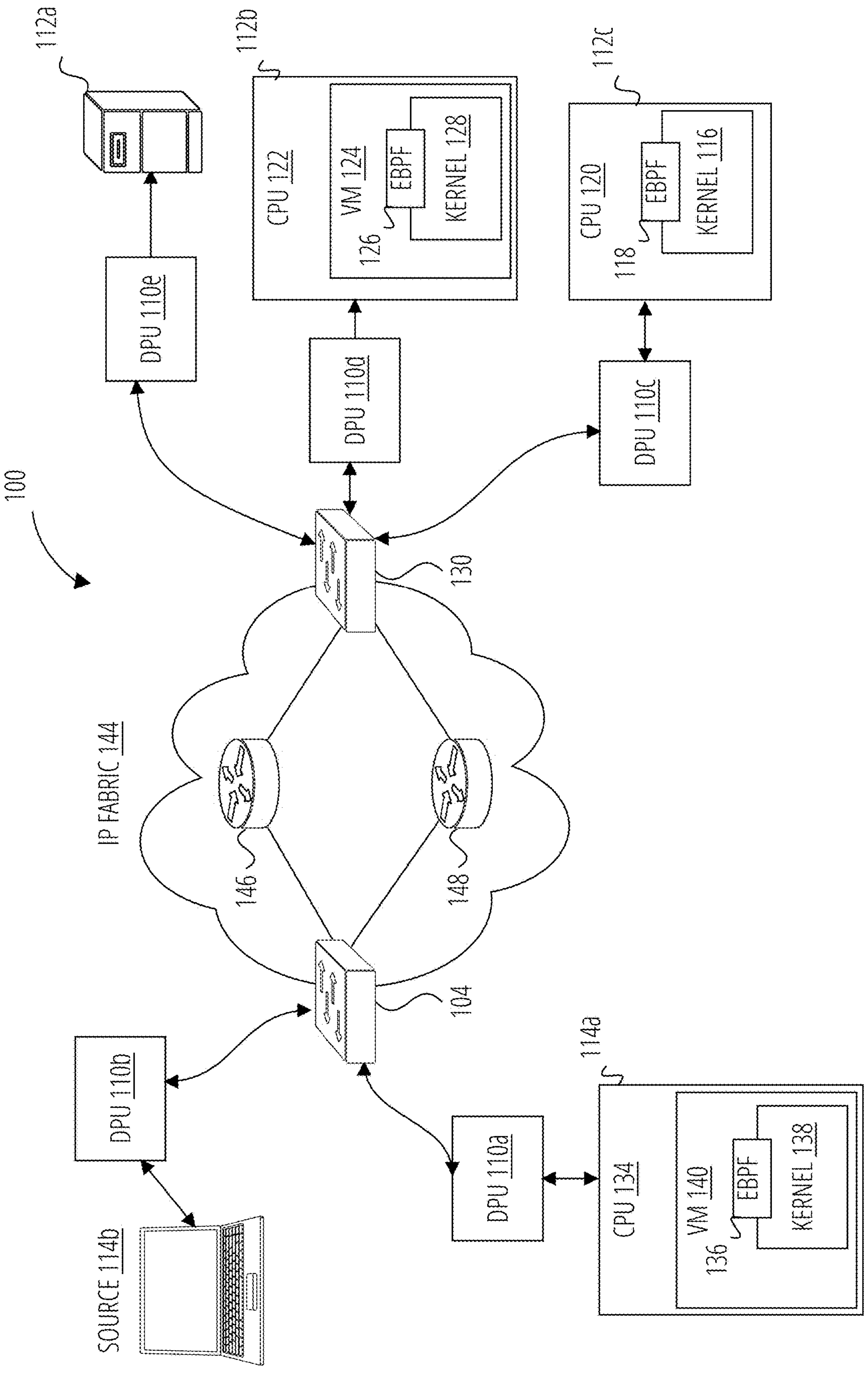
FIG. 1 illustrates a block diagram of an example of a subsystem of a network that includes data processing units (DPUs) and extended Berkley packet filters (eBPFs) that perform various network component functions including, e.g., security operations, in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In some aspects, the techniques described herein relate to a method of processing data flows through policy-enforcement points of a network fabric, the method including: receiving, at a first policy-enforcement point, a data flow including data packets and metadata, the metadata attesting to one or more security operations that have been applied to at least a first subset of data packets of the data flow; determining, based on the metadata, which security operations have been performed on which of the data packets of the data flow to generate a determination result; and applying, based on the determination result, one or more security actions to the data flow.

In some aspects, the techniques described herein relate to a method, further including: parsing the metadata from the data flow; and determining which attestations in the metadata are associated with which of the data packets and which of the attestations are associated with which of the one or more security operations, wherein the attestations in the metadata are cryptographical secure information attesting to the one or more security operations that have been applied to at least the first subset of data packet of the data flow.

In some aspects, the techniques described herein relate to a method, wherein the one or more security actions include: (i) allowing the first subset of data packets through the first policy-enforcement point based on whether the one or more security operations satisfy one or more security criteria, (ii) performing one or more additional security operations on the first subset of data packets when the one or more security operations performed on the data packet does not satisfy the security criteria, and/or (iii) determining the security criteria upon which the one or more security actions for the first subset of data packets depends, the security criteria being based on a source and/or a destination of the first subset data packet.

In some aspects, the techniques described herein relate to a method, wherein the one or more security actions include: determining that one or more additional security operations are required for the first subset of data packets to be allowed into a workload; and performing, at the first policy-enforcement point, the one or more additional security operations on some of the first subset of data packets and dropping a remainder of the first subset of data packets, depending on available processing resources at the first policy-enforcement point.

In some aspects, the techniques described herein relate to a method, wherein the one or more security actions include: determining, for future data packets of the data flow, a load balancing that includes a division of the one or more additional security operations between the first policy-enforcement point and upstream nodes of the network fabric that are upstream the data flow from the first policy-enforcement point; and signaling, to the upstream nodes, the division of the one or more additional security operations.

In some aspects, the techniques described herein relate to a method, further including: performing, at the first policy-enforcement point, other security operation on the data flow; and determining, based on the metadata, that the other security operation is not necessary for the first subset of data packets, wherein the one or more security actions includes omitting the first subset of data packets from the data packets on which the first policy-enforcement point performs the other security operation.

In some aspects, the techniques described herein relate to a method, wherein determining that the other security operation is not necessary for the first subset of data packets is based, at least partly, on determining that the other security operation is redundant of the one or more security operations.

In some aspects, the techniques described herein relate to a method, wherein determining that the other security operation is not necessary for the first subset of data packets is based, at least partly, on determining that: the other security operation is not necessary based on an identity of a user that originated the first subset of data packets, the identity of the user being securely attested to in the metadata, the other security operation is not necessary based on an identity of an application that originated the first subset of data packets, the identity of the application being securely attested to in the metadata, the other security operation is not necessary based on a protocol, a source address, a source port, a destination address, and/or a destination port of the first subset of data packets, and/or the other security operation is not necessary based on a trust zone to which the first policy-enforcement point allows entrance of the data flow.

In some aspects, the techniques described herein relate to a method, further including: determining security vulnerabilities of a workload; and determining security criteria for the workload based on the security vulnerabilities, wherein the one or more security actions include determining whether a data packet of the data flow is allowed into the workload based on the metadata indicating that the one or more security operations performed on the data packet satisfy the security criteria.

In some aspects, the techniques described herein relate to a method, wherein the first policy-enforcement point is a firewall, an extended Berkley packet filter (eBPF), a data processing unit (DPU), or program called in response to an operating system (OS) hook.

In some aspects, the techniques described herein relate to a method, wherein the first policy-enforcement point is: (a) a policy-enforcement point at a boundary of a trust zone, (b) a final policy-enforcement point before a workload, (c) a policy-enforcement point at a tunnel endpoint of an encapsulation protocol or a virtual network, or (d) a policy-enforcement point at a boundary of a network.

In some aspects, the techniques described herein relate to a method, wherein the metadata is added to the data flow by one or more other policy-enforcement points along a path of the data flow, and the one or more other policy-enforcement points include a firewall, an extended Berkley packet filter (eBPF), or a data processing unit (DPU).

In some aspects, the techniques described herein relate to a method, wherein the one or more security operations include a web application firewall (WAF) function, a layer three (L3) firewall function, a layer seven (L7) firewall function, deep packet inspection, anomaly detection, cyber-attack signature detection, packet filtering, or an intrusion prevention system function.

In some aspects, the techniques described herein relate to a method, wherein the metadata is encoded in one or more transport layer security (TLS) extension fields, in one or more headers of Internet protocol (IP) packet, in one or more optional Internet protocol version 6 (IPv6) extension headers, or one or more headers of an encapsulation protocol.

In some aspects, the techniques described herein relate to a computing apparatus including: a processor; and a memory storing instructions that, when executed by the processor, configure the computing apparatus to: receive, at a first policy-enforcement point, a data flow including data packets and metadata, the metadata attesting to one or more security operations that have been applied to at least a first subset of data packets of the data flow; determine, based on the metadata, which security operations have been performed on which of the data packets of the data flow to generate a determination result; and apply, based on the determination result, one or more security actions to the data flow.

In some aspects, the techniques described herein relate to a computing apparatus, wherein, when executed by the processor, the instructions further configure the computing apparatus to: parse the metadata from the data flow; and determine which attestations in the metadata are associated with which of the data packets and which of the attestations are associated with which of the one or more security operations, wherein the attestations in the metadata are cryptographical secure information attesting to the one or more security operations that have been applied to at least the first subset of data packet of the data flow.

In some aspects, the techniques described herein relate to a computing apparatus, wherein the one or more security actions include: (a) allowing the first subset of data packets through the first policy-enforcement point based on whether the one or more security operations satisfy one or more security criteria, (b) performing one or more additional security operations on the first subset of data packets when the one or more security operations performed on the data packet does not satisfy the security criteria, and/or (c) determining the security criteria upon which the one or more security actions for the first subset of data packets depends, the security criteria being based on a source and/or a destination of the first subset data packet.

In some aspects, the techniques described herein relate to a computing apparatus, wherein the instructions cause the computing apparatus to apply the one or more security actions to the data flow by configuring the computing apparatus to: determine that one or more additional security operations are required for the first subset of data packets to be allowed into a workload; and perform, at the first policy-enforcement point, the one or more additional security operations on some of the first subset of data packets and dropping a remainder of the first subset of data packets, depending on available processing resources at the first policy-enforcement point.

In some aspects, the techniques described herein relate to a computing apparatus, wherein the instructions cause the computing apparatus to apply the one or more security actions to the data flow by configuring the computing apparatus to: determine, for future data packets of the data flow, a load balancing that includes a division of the one or more additional security operations between the first policy-enforcement point and upstream nodes of the network fabric that are upstream the data flow from the first policy-enforcement point; and signal, to the upstream nodes, the division of the one or more additional security operations.

In some aspects, the techniques described herein relate to a computing apparatus, wherein, when executed by the processor, the instructions further configure the computing apparatus to: perform, at the first policy-enforcement point, other security operation on the data flow; and determine, based on the metadata, that the other security operation is not necessary for the first subset of data packets, wherein the one or more security actions includes omitting the first subset of data packets from the data packets on which the first policy-enforcement point performs the other security operation.

In some aspects, the techniques described herein relate to a computing apparatus, wherein, when executed by the processor, the instructions further configure the computing apparatus to: determine that the other security operation is not necessary for the first subset of data packets is based, at least partly, on determining that the other security operation is redundant of the one or more security operations.

In some aspects, the techniques described herein relate to a computing apparatus, wherein the instructions cause the computing apparatus to determine that the other security operation is not necessary for the first subset of data packets by configuring the computing apparatus to determine that: the other security operation is not necessary based on an identity of a user that originated the first subset of data packets, the identity of the user being securely attested to in the metadata, the other security operation is not necessary based on an identity of an application that originated the first subset of data packets, the identity of the application being securely attested to in the metadata, the other security operation is not necessary based on a protocol, a source address, a source port, a destination address, and/or a destination port of the first subset of data packets, and/or the other security operation is not necessary based on a trust zone to which the first policy-enforcement point allows entrance of the data flow.

In some aspects, the techniques described herein relate to a computing apparatus, wherein, when executed by the processor, the instructions further configure the computing apparatus to: determine security vulnerabilities of a workload; and determine security criteria for the workload based on the security vulnerabilities, wherein the one or more security actions include determining whether a data packet of the data flow is allowed into the workload based on the metadata indicating that the one or more security operations performed on the data packet satisfy the security criteria.

In some aspects, the techniques described herein relate to a computing apparatus, wherein the first policy-enforcement point is a firewall, an extended Berkley packet filter (eBPF), a data processing unit (DPU), or program called in response to an operating system (OS) hook.

In some aspects, the techniques described herein relate to a computing apparatus, wherein the first policy-enforcement point is: (a) a policy-enforcement point at a boundary of a trust zone, (b) a final policy-enforcement point before a workload, (c) a policy-enforcement point at a tunnel endpoint of an encapsulation protocol or a virtual network, or (d) a policy-enforcement point at a boundary of a network.

In some aspects, the techniques described herein relate to a computing apparatus, wherein the metadata is added to the data flow by one or more other policy-enforcement points along a path of the data flow, and the one or more other policy-enforcement points include a firewall, an extended Berkley packet filter (eBPF), or a data processing unit (DPU).

In some aspects, the techniques described herein relate to a computing apparatus, wherein the one or more security operations include a web application firewall (WAF) function, a layer three (L3) firewall function, a layer seven (L7) firewall function, deep packet inspection, anomaly detection, cyber-attack signature detection, packet filtering, or an intrusion prevention system function.

In some aspects, the techniques described herein relate to a computing apparatus, wherein the metadata is encoded in one or more transport layer security (TLS) extension fields, in one or more headers of Internet protocol (IP) packet, in one or more optional Internet protocol version 6 (IPv6) extension headers, or one or more headers of an encapsulation protocol.

In some aspects, the techniques described herein relate to a non-transitory computer-readable storage medium, the computer-readable storage medium including instructions that when executed by a computer, cause the computer to: receive, at a first policy-enforcement point, a data flow including data packets and metadata, the metadata attesting to one or more security operations that have been applied to at least a first subset of data packets of the data flow; determine, based on the metadata, which security operations have been performed on which of the data packets of the data flow to generate a determination result; and apply, based on the determination result, one or more security actions to the data flow.

In some aspects, the techniques described herein relate to a non-transitory computer-readable storage medium, wherein, when executed by a computer, the instructions cause the computer to: parse the metadata from the data flow; and determine which attestations in the metadata are associated with which of the data packets and which of the attestations are associated with which of the one or more security operations, wherein the attestations in the metadata are cryptographical secure information attesting to the one or more security operations that have been applied to at least the first subset of data packet of the data flow.

In some aspects, the techniques described herein relate to a non-transitory computer-readable storage medium, wherein the one or more security actions include: (a) allowing the first subset of data packets through the first policy-enforcement point based on whether the one or more security operations satisfy one or more security criteria, (b) performing one or more additional security operations on the first subset of data packets when the one or more security operations performed on the data packet does not satisfy the security criteria, and/or (c) determining the security criteria upon which the one or more security actions for the first subset of data packets depends, the security criteria being based on a source and/or a destination of the first subset data packet.

In some aspects, the techniques described herein relate to a non-transitory computer-readable storage medium, wherein, when executed by a computer, the instructions cause the computer to apply the one or more security actions to the data flow by causing the computer to: determine that one or more additional security operations are required for the first subset of data packets to be allowed into a workload; and perform, at the first policy-enforcement point, the one or more additional security operations on some of the first subset of data packets and dropping a remainder of the first subset of data packets, depending on available processing resources at the first policy-enforcement point.

In some aspects, the techniques described herein relate to a non-transitory computer-readable storage medium, wherein, when executed by a computer, the instructions cause the computer to apply the one or more security actions to the data flow by causing the computer to: determine, for future data packets of the data flow, a load balancing that includes a division of the one or more additional security operations between the first policy-enforcement point and upstream nodes of the network fabric that are upstream the data flow from the first policy-enforcement point; and signal, to the upstream nodes, the division of the one or more additional security operations.

In some aspects, the techniques described herein relate to a non-transitory computer-readable storage medium, wherein, when executed by a computer, the instructions cause the computer to: perform, at the first policy-enforcement point, other security operation on the data flow; and determine, based on the metadata, that the other security operation is not necessary for the first subset of data packets, wherein the one or more security actions includes omitting the first subset of data packets from the data packets on which the first policy-enforcement point performs the other security operation.

In some aspects, the techniques described herein relate to a non-transitory computer-readable storage medium, wherein, when executed by a computer, the instructions cause the computer to: determine that the other security operation is not necessary for the first subset of data packets is based, at least partly, on determining that the other security operation is redundant of the one or more security operations.

In some aspects, the techniques described herein relate to a non-transitory computer-readable storage medium, wherein, when executed by a computer, the instructions cause the computer to determine that the other security operation is not necessary for the first subset of data packets by causing the computer to determine that: the other security operation is not necessary based on an identity of a user that originated the first subset of data packets, the identity of the user being securely attested to in the metadata, the other security operation is not necessary based on an identity of an application that originated the first subset of data packets, the identity of the application being securely attested to in the metadata, the other security operation is not necessary based on a protocol, a source address, a source port, a destination address, and/or a destination port of the first subset of data packets, and/or the other security operation is not necessary based on a trust zone to which the first policy-enforcement point allows entrance of the data flow.

In some aspects, the techniques described herein relate to a non-transitory computer-readable storage medium, wherein, when executed by a computer, the instructions cause the computer to: determine security vulnerabilities of a workload; and determine security criteria for the workload based on the security vulnerabilities, wherein the one or more security actions include determining whether a data packet of the data flow is allowed into the workload based on the metadata indicating that the one or more security operations performed on the data packet satisfy the security criteria.

In some aspects, the techniques described herein relate to a non-transitory computer-readable storage medium, wherein the first policy-enforcement point is a firewall, an extended Berkley packet filter (eBPF), a data processing unit (DPU), or program called in response to an operating system (OS) hook.

In some aspects, the techniques described herein relate to a non-transitory computer-readable storage medium, wherein the first policy-enforcement point is: (a) a policy-enforcement point at a boundary of a trust zone, (b) a final policy-enforcement point before a workload, (c) a policy-enforcement point at a tunnel endpoint of an encapsulation protocol or a virtual network, or (d) a policy-enforcement point at a boundary of a network.

In some aspects, the techniques described herein relate to a non-transitory computer-readable storage medium, wherein the metadata is added to the data flow by one or more other policy-enforcement points along a path of the data flow, and the one or more other policy-enforcement points include a firewall, an extended Berkley packet filter (eBPF), or a data processing unit (DPU).

In some aspects, the techniques described herein relate to a non-transitory computer-readable storage medium, wherein the security operations include a web application firewall (WAF) function, a layer three (L3) firewall function, a layer seven (L7) firewall function, deep packet inspection, anomaly detection, cyber-attack signature detection, packet filtering, or an intrusion prevention system function.

In some aspects, the techniques described herein relate to a non-transitory computer-readable storage medium, wherein the metadata is encoded in one or more transport layer security (TLS) extension fields, in one or more headers of Internet protocol (IP) packet, in one or more optional Internet protocol version 6 (IPv6) extension headers, or one or more headers of an encapsulation protocol.

In some aspects, the techniques described herein relate to a method of determining an action applied to the data packets using metadata representing security functions applied to the data flow upstream in a network, the method including: processing a data packet through a computer network including processing the data packet at a data processing unit (DPU) and/or an extended Berkeley packet filter (eBPF) that is executing on a host; attaching metadata to the data packet, the metadata representing security functions applied to the data packet when processed by the DPU and/or the eBPF, and the metadata accompanying the data packet as the data packet flows through the network; determining, at a subsequent enforcement point the computer network that receives the data packet after the data packet has been processed by the DPU and/or the eBPF, a security context of the data packet based on the metadata; and determining, at the subsequent enforcement point, an action to be applied to the data packet based on the security context, wherein the metadata is attached to the data packet by including the metadata in an optional header of the data packet, and the action is passing the data packet to a workload, dropping the data packet, or applying another security function to the data packet, and the subsequent enforcement point is another DPU and/or eBPF.

In some aspects, the techniques described herein relate to a method of processing data flows through policy-enforcement points of a network fabric, the method including: receiving, at a first policy-enforcement point, a data flow including data packets and metadata, the metadata including one or more attestations that are a cryptographical secure and attest to one or more security operations that have been applied to at least a first subset of the data flow; parsing the metadata from the data flow and determining, based on the metadata, which security operations have been performed on which data packets of the data flow to generate a determination result; analyzing the determination result to determine one or more security actions to be applied to respective data packets of the data flow.

In some aspects, the techniques described herein relate to a method, wherein the one or more security actions include: (i) deciding whether to allow a data packet through the first policy-enforcement point based on whether a set of security operations performed on the data packet satisfies security criteria of the first policy-enforcement point, (ii) determining one or more additional security operations on the data packet when the set of security operations performed on the data packet does not satisfy the security criteria of the first policy-enforcement point, (iii) determining the security criteria of the first policy-enforcement point based on the source and/or destination of the data packet, or (iv) signaling a division of security operations performed among the first policy-enforcement point and one or more upstream policy-enforcement points that are upstream the data flow from the first policy-enforcement point.

EXAMPLE EMBODIMENTS

Additional features and advantages of the disclosure will be set forth in to the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art to differentiate which data packets arriving at a given policy-enforcement point in a security fabric have undergone which security operations to assess what security actions to apply the each of the respective data packets. For example, the policy-enforcement point can be a router, switch, firewall, security appliance, data processing unit (DPU), extended Berkley packet filter (eBPF), an operating system (OS) hook (e.g., a Linux security module (LSM) hook, a Windows kernel system function hook, etc.), and the security fabric can include a firewall, a distributed firewall, respective trust zones in a network, etc. Further, the data packets arriving at the given policy-enforcement point can traverse a network fabric in which a distributed security fabric has been operationalized. The functions of the security fabric can be distributed among nodes of the network fabric including in routers, servers, firewalls, top of rack (ToR) switches, core layer switches, etc.

For a given data flow, information indicating which security operations have been performed upstream from a given policy-enforcement point (for example, prior-security-operations information) can be used to differentiate which data packets arriving at the given policy-enforcement point have undergone which security operations. The prior-security-operations information can be cryptographically verifiable attestations encoded in metadata that accompanies the data flow. For example, the metadata can be encoded in transport layer security (TLS) extension fields, headers of Internet protocol (IP) packets, Internet protocol version 6 (IPv6) extension headers, and/or headers of an encapsulation protocol (e.g., a virtual network such as the generic routing encapsulation (GRE) protocol, generic UDP encapsulation (GUE) protocol, generic network virtualization encapsulation (Geneve) protocol, or virtual extensible local area network (VXLAN) protocol).

As discussed above, traffic through a network can take different routes to the given policy-enforcement point, and different security operations can be performed at different nodes or policy-enforcement points within the network. Consequently, different routes through the network can also result in different data packets arriving at a workload having undergone different security operations. For example, east-west traffic might have undergone different security operations than north-south traffic. Further, different data packets traversing the same route might not be treated uniformly, such that different data packets traversing the route have undergone different security operations.

Based on the prior-security-operations information of which security operations have been performed on a data packet, the given policy-enforcement point can decide to allow/drop the data packet, select additional security operations, determine to omit certain default security operations, or take some other security action.

For example, when the given policy-enforcement point has a default setting of applying a web application firewall (WAF) function and the prior-security-operations information indicates that the WAF function has been performed all data packets in the data flow at an upstream policy-enforcement point, then the given policy-enforcement point can omit performing the WAF function and thereby avoid redundant processing.

Additionally or alternatively, as the volume of traffic in the data flow increases, the upstream policy-enforcement point may lack sufficient processing resources to perform the WAF function on all data packets in the data flow or some of the data packets in the data flow may be routed through another policy-enforcement point that does not perform the WAF function. In this case, some or all of the data packets arriving at given policy-enforcement point would not have undergone the WAF function, and the given policy-enforcement point can use the prior-security-operations information to determine on which data packets to apply the WAF function. Thus, the systems and methods disclosed herein can be used to dynamically adapt to changes in traffic volume by dynamically load balancing the security operations among the policy-enforcement points within a distributed security fabric.

According to certain non-limiting examples, a network can include a distributed security fabric having an eBPF upstream the data flow from a DPU. For example, the eBPF can be proximate to a source on which the application generating the data flow is located, and the eBPF can add metadata attesting to an identity of the user (user ID), an identity of the application (application ID) that originates the data flow, and one or more security operations applied to the data flow. For illustration purposes, the DPU can be at a a VXLAN Tunnel EndPoint (VTEP), and can be configured to perform one or more additional security operations. Thus, which actions can be taken at the DPU can depend on the metadata from the host. In addition to the upstream security operations, the metadata can include other information (e.g., the user ID and application ID) that can be relevant from a security and observability perspective at the DPU. Examples of the metadata that is added at the eBPF layer that the DPU could then use to determine the security action(s) can include, but is not limited to, process contacts, user identity, service chaining of some security functions, etc. For example, if a WAF function is executed on the host, at the eBPF level, then the system can share that security context with the DPU, and based on this metadata, the DPU can notice that WAF functions have already been done, and the DPU then selects to perform an OSI layer seven (L7) firewall, rather than duplicating WAF functions.

According to certain embodiments, the prior-security-operations information and other relevant information can be communicated via bump-in-the-wire type processing. For example, the metadata can be sent out as a pre-packet that affects the configuration along the wire, and then the packets are sent out.

According to certain embodiments, the prior-security-operations information and other relevant information can be communicated as attributes in an overlay network or as optional IPv6 extension headers. This metadata can be sent with the packet, and is not required to be sent in advance of the packet. For example, this metadata can be sent such that it is ensured that downstream policy-enforcement points (e.g., the DPU in the above scenario) process the optional IPv6 headers before processing the payload of the packet. And the same is true when a TLS extension field is used to convey the prior-security-operations information and other relevant information. For example, TLS extensions can be used as part of this communication process. The TLS extensions can include metadata that provides more context about the data flow.

Further, by using an eBPF program to add observability metadata and integrating this with a DPU device that is capable of acting on the metadata as the packets arrive from the host, the DPU is informed as to what security operation was done at the particular layer in the system. For example, if the eBPF agent performed a WAF operation, then the downstream DPU can learn of that and optimize the security functions it performs to exclude doing any WAF operations since those were done upstream in an attestable way that could be expressed in the signed metadata that is inserted into the flow.

According to certain non-limiting examples, security operations can include, e.g., data-packet filtering, load balancing, security screening, malware detection, firewall protection, data-packet routing, data-packet switching, data-packet forwarding, computing header checksums, or implementing network policies. Security screening can include, but is not limited to, deep packet inspections, analysis of behavioral graphs for detection of cyber attacks and/or malicious software, anomaly detection, cyber-attack signature detection, packet filtering, intrusion prevention systems, extended detection and response, endpoint detection and response, and/or network detection and response functions.

According to certain non-limiting examples, the systems and methods disclosed herein can determine an action applied to the data packets using metadata representing security functions applied to the data flow upstream in a network, by: (1) processing a data packet through a computer network including processing the data packet at a data processing unit (DPU) and/or an extended Berkeley packet filter (eBPF) that is executing on a host; (2) attaching metadata to the data packet, the metadata representing security functions applied to the data packet when processed by the DPU and/or the eBPF, and the metadata accompanying the data packet as the data packet flows through the network; (3) determining, at a subsequent enforcement point the computer network that receives the data packet after the data packet has been processed by the DPU and/or the eBPF, a security context of the data packet based on the metadata; and (4) determining, at the subsequent enforcement point, an action to be applied to the data packet based on the security context, The metadata is attached to the data packet by including the metadata in an optional header of the data packet. The action is passing the data packet to a workload, dropping the data packet, or applying another security function to the data packet, and the subsequent enforcement point is another DPU and/or eBPF.

According to certain non-limiting examples, the systems and methods disclosed herein can process data flows through a policy-enforcement points of a network fabric, by: (1) receiving, at a first policy-enforcement point, a data flow comprising data packets and metadata, the metadata including one or more attestations that are a cryptographical secure and attest to one or more security services that have been applied to at least a first subset of the data flow; (2) parsing the metadata from the data flow and determining, based on the metadata, which security operations have been performed on which data packets of the data flow to generate a determination result; and (3) analyzing the determination result to determine one or more security actions to be applied to respective data packets of the data flow. The one or more security actions can include, e.g.: (i) deciding whether to allow a data packet through the first policy-enforcement point based on whether a set of security operations performed on the data packet satisfies security criteria of the first policy-enforcement point; (ii) determining one or more additional security operations on the data packet when the set of security operations performed on the data packet does not satisfy the security criteria of the first policy-enforcement point; (iii) determining the security criteria of the first policy-enforcement point based on the source and/or destination of the data packet, or (iv) signaling a division of security operations performed among the first policy-enforcement point and one or more upstream policy-enforcement points that are upstream the data flow from the first policy-enforcement point.

According to certain non-limiting examples, the systems and methods disclosed herein use metadata that is attestable to encode in a data flow information of the security chain for the data flow as it propagates through a network fabric. For example, an extended Berkeley packet filter (eBPF) program to enrich data packets with additional metadata crucial for enhancing security and observability as they traverse the network. This metadata encompasses details such as process context, user identity, and the sequence of security functions applied (service chaining). By using an eBPF program to add observability metadata, a DPU device downstream with respect to the data flow can use the metadata to determine what actions to take on the packets in the data flow. For example, the DPU can be informed as to what security operations were done at the particular layer in the system, and redundant processing can be avoided by not repeating those security operations that have already been performed.

For example, if the data flow goes through a web application firewall (WAF) function, then attestable metadata indicating which WAF function was performed. Then, downstream the data flow goes through other security operation, such as an L7 firewall, and so forth. Eventually, the data flow arrives at a policy-enforcement point that can use information of the previous security operation to decide what action to take with respect to the data flow. For example, the PEP can be a data processing unit (DPU), and the DPU can look at the attestable metadata and learn that a WAF operation was already performed on this by an extended Berkley packer filter (eBPF) agent, which is upstream. Thus, the WAF function does not need to be repeated at the DPU, freeing up bandwidth for the DPU to perform other security operation other than the WAF function.

FIG. 1 illustrates a system 100, which is an example of a portion of a network fabric. System 100 provides an example of how metadata can be added to packets from an application to provide increased observability and security. System 100 can include various sources of data (e.g., source 114*a* and source 114*b*) which transmit the data via the IP fabric 144 to one or more destinations (e.g., destination 112*a*, destination 112*b*, and destination 112*c*).

Source 114*a* can include a CPU 134 on which a virtual machine (for example, VM 140) is running, and VM 140 can include a kernel 138 that is accessed via eBPF 136.

Destination 112*b* can include a CPU 122 on which a virtual machine (for example, VM 124) is running, and VM 124 can include a kernel 128 that is accessed via eBPF 126. Destination 112*c* can include CPU 120 that includes kernel 116 and an eBPF 118. Any of the DPUs, switches, routers, and hosts on DPUs (which can include ePBFs) can be policy-enforcement points.

According to certain non-limiting examples, the data can be generated by an application running on VM 140, which is on the CPU 134 of source 114*a*. An eBPF 136 on the VM 140 observes the operations of the application, including, e.g., system calls and other interactions with the kernel 138. Generally, the eBPF 136 can provide observability information at the application layer of the open systems interconnection (OSI) hierarchy. The application can be part of a cloud-based application that includes software installed on a user device (e.g., source 114*a*) and software installed on a server (e.g., destination 112*b*). User interactions at the source endpoint generate data that is then sent to the destination endpoint where additional actions are taken on the data flow.

For example, the application can be a JAVA application running in VM 140, and the application is performing some business logic in which the application reaches out to a database to use some information that is read from the database to perform the business logic. The eBPF 136 can monitor the execution of the application, noting observations/information such as the user ID, the application ID, and that the application retrieved information from a given database. The application generates a data flow that includes the noted observations as metadata (e.g., included in-band in IP packet headers). Along the path (e.g., at the destination) the data flow ends up going through one or more policy-enforcement points (e.g., a firewall, an eBPF, a DPU, or an OS hook). The policy-enforcement point can then look into the metadata, and based on the noted observations in the metadata (e.g., the prior security context of which security operations have been performed upstream), the policy-enforcement point can apply additionally security operations, pass the data flow through the policy-enforcement point, or drop the data flow, for example. Further, the policy-enforcement point can use additional context provided by the metadata, such as the user ID or the application ID to determine what security actions to take at the policy-enforcement point.

Further, eBPF 136 can monitor the execution of the application, noting information such as: (i) the device (e.g., the endpoint, irrespective of its location); (ii) the user (e.g., the one logged into the endpoint); (iii) the application (e.g., what generates the traffic); (iv) the location (e.g., the network location the traffic was generated on); and/or (v) the destination (e.g., the fully qualified domain name (FQDN) to which this traffic was intended).

Additionally or alternatively, eBPF 136 can generate and/or analyze program traces for the application to provide information regarding the security context of the data flow. Based on observations of the application, eBPF 136 can determine whether the application is exhibiting indicia of behaving anomalously or indicia of cyber threats (e.g., intrusion detection signatures, evidence of a compromise, a vulnerability, or an exploit of vulnerability).

According to certain non-limiting examples, a data center or network can be divided into trust zones. For example, users and/or network professionals can manually segment their network into trust zones (e.g., this can occur for virtual local area networks (VLANs)). Consider, for example, the case in which a customer puts all of the voice traffic on one VLAN, and all of the data center traffic on another VLAN. The voice traffic can be in a lower trust zone, and the data center traffic can be in a higher trust zone. The trust zones can have certain security criteria for data flows to be allowed into the trust zone. A policy-enforcement point can be at the boundary of the trust zone and the security actions determined for the policy-enforcement point can depend on comparing the prior-security-operations information in the metadata with security criteria for entering the trust zone.

As discussed with reference to FIG. 3, a virtual network can be used with an encapsulation protocol to provide a overlay/virtual route (e.g., a tunnel) through the IP fabric 144. Further, switch 104 and switch 130 can be implemented in DPUs, and tunnel termination can occur at the DPUs. For example, the overlay route can be implemented via an encapsulation protocol such as GRE, VX LAN, or Geneve. Whereas the eBPF in a host (e.g., VM 140) can include metadata in headers of an IP packet based on L7 observation within the host, the DPU implementing a virtual switch can encapsulate the IP packet within a packet of the virtual network, and the DPU can include additional metadata in the optional fields of the packet of the virtual network. This additional metadata can be L3 observations made by the DPU (e.g., the virtual switch).

According to certain non-limiting examples, the virtual network can be a VXLAN network. VXLAN provides a Layer 2 (L2) overlay scheme over a Layer 3 (L3) network. For example, VXLAN can use MAC Address-in-User Datagram Protocol (MAC-in-UDP) encapsulation to provide a means to extend Layer 2 segments across the data center network. VXLAN can support a flexible, large-scale multitenant environment over a shared common physical infrastructure. The transport protocol over the physical data center network can include IP plus UDP. For example, VXLAN can define a MAC-in-UDP encapsulation scheme where the original Layer 2 frame has a VXLAN header added and is then placed in a UDP-IP packet. With this MAC-in-UDP encapsulation, VXLAN tunnels an L2 network over an L3 network. The packets for VXLLAN can include the original L2 frame proceeded by a VXLAN header, which is encapsulated with a UDP header, which is further encapsulated to have an outer IP header, and then that entire structure is encapsulated with an outer MAC header.

A DPU implementing a virtual switch can use an optional field in one or more of the headers to provide metadata that is used for observability or security functions. This metadata can be added using an eBPF operating in a host on the DPU or can be added using other hardware within the DPU (e.g., a hardware engine, an accelerator, or networking circuitry). The observations on the DPU can include various network protocols and security processes/policies performed at the DPU on the data flow. As discussed with reference to FIG. 7, DPUs can support software including network protocol offload (e.g., TCP/IP acceleration, RDMA and RPC); initiator and target side storage (e.g., block and file protocols); high-level application APIs (e.g., compute, network and storage); fine grain load balancing, traffic management, and quality of service (QOS); network virtualization and network function virtualization (NFV); and firewall, security, deep packet inspection (DPI), and encryption (e.g., IPsec, SSL/TLS, datagram transport Layer security (DTLS),) quick UDP internet connections (QUIC), etc.

Returning to FIG. 1, the application generating the data flow can run on one of the sources (e.g., source 114*a* or source 114*b*). Metadata can be generated and added to the data flow by eBPF 136 on VM 140, which is executed by CPU 134 of source 114*a*. Additionally or alternatively, an eBPF program can operate on CPU 134. The data flow can go from the source through the IP fabric 144, which can include switch 104, switch 130, router 146, and router 148. As discussed above, the DPUs (e.g., DPU 110*a*, DPU 110*b*, DPU 110*c*, DPU 110*d*, and DPU 110*c*) can perform various networking functions, including, e.g., security operations and the functions of the switch 104 and switch 130. These DPUs can also add metadata to the packets (e.g., the encapsulated packets sent via a virtual network) based on which security operations are performed at the DPUs.

Metadata that is added to the optional headers or optional fields of the data flow at the source can be read from the data flow at the destination and used for determining the security actions that are to be taken on the received data flows. For example, for destination 112*a*, DPU 110*e* can read the additional metadata applied by a DPU at the source (e.g., DPU 110*a*), and the additional metadata can inform a determination of processing steps at DPU 110*e*, or the additional metadata can be passed along to the destination 112*a* to inform the security actions to be applied there.

Similarly, for destination 112*b*, the DPU 110*d* can read the additional metadata applied by a DPU at the source (e.g., DPU 110*a*), and the additional metadata can inform a determination of processing steps (e.g., security actions) at DPU 110*d*, or the additional metadata can be passed along to destination 112*a* to inform processing (e.g., security actions) that occurs there. Additionally, eBPF 126 can read metadata generated by eBPF 136, which is encoded, e.g., on a header of the IP packets. The additional metadata from DPU 110*a* and the metadata from eBPF 136 can be used together to inform processing steps (e.g., security actions) to be performed at VM 124 and/or in kernel 128.

For destination 112*c*, the application can run directly on CPU (for example, CPU 120) rather than on a VM that is running on the CPU. For destination 112*c*, DPU 110*c* can read the metadata applied by a DPU at the source (e.g., DPU 110*a*), and the additional metadata can inform a determination of processing steps at (e.g., security actions) DPU 110*c*, or the additional metadata can be passed along to destination 112*c* to inform processing that occurs there. Additionally, eBPF 126 can read metadata generated by eBPF 136, which is encoded, e.g., on a header of the IP packets. The additional metadata from DPU 110*a* and the metadata from eBPF 136 can be used together to inform processing steps (e.g., security actions) performed by the CPU 120 and/or in kernel 116.

According to certain non-limiting examples, an OS hook such as a Linux security module (LSM) hook can be used to recognize based on the prior-security-operations information in the metadata when security actions should be performed and the LSM hook can trigger the execution of an eBPF to either determine what security actions to take or to perform the security actions. LSM hooks are discussed further with reference to FIG. 6C.

Figure 2:
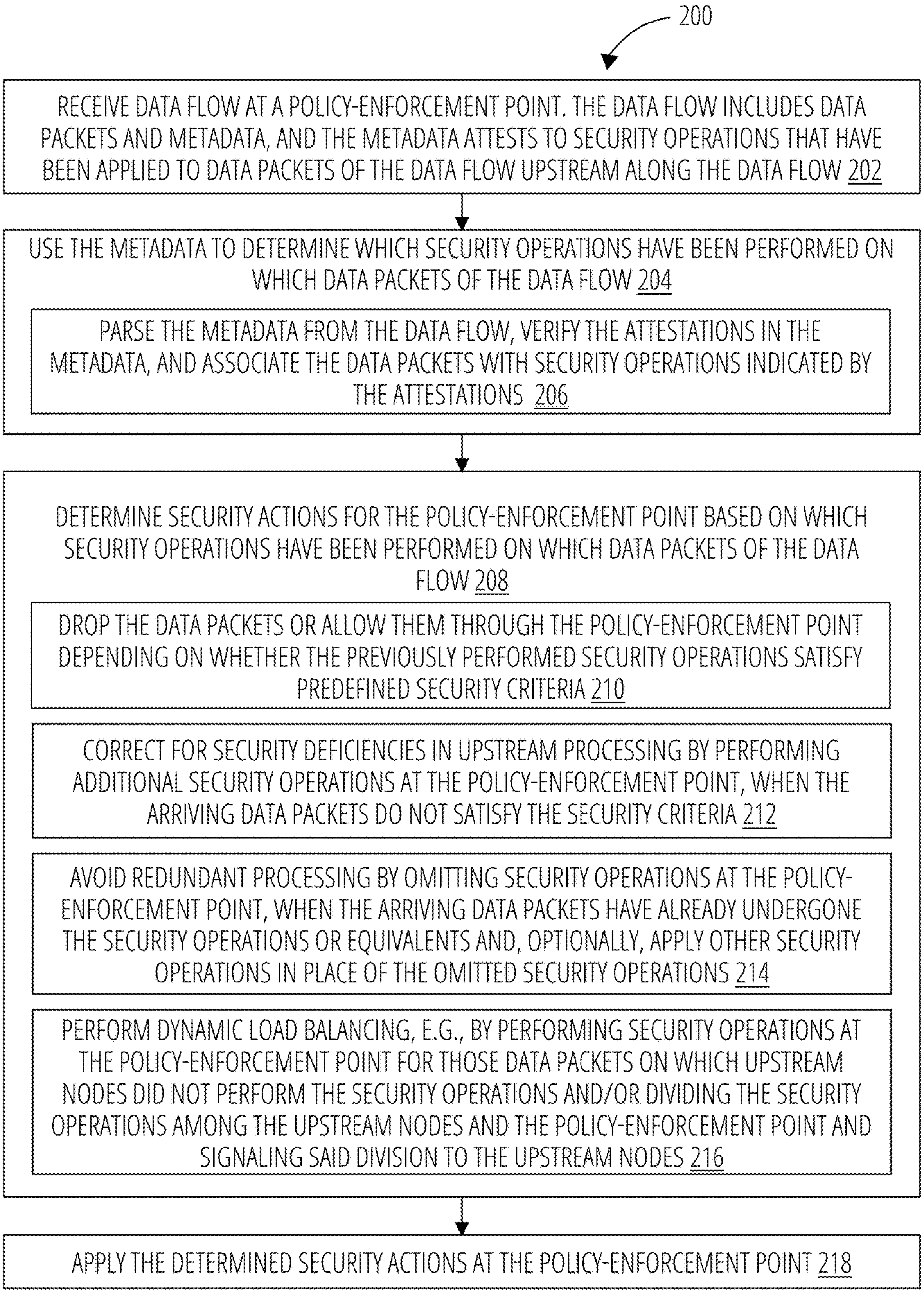
FIG. 2 illustrates an example of a method for adding in-band metadata to data flows, in accordance with some embodiments.

FIG. 2 illustrates an example method 200 for processing data flows through policy-enforcement points of a network fabric. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, in step 202, the method includes receiving a data flow at a policy-enforcement point.

The data flow includes data packets and metadata, and the metadata includes attestations about which security operations have been applied to data packets. For example, the data packets arriving at the policy-enforcement point may have undergone one or more security operations prior to arriving at the policy-enforcement point (e.g., the one or more security operations could have been applied at upstream nodes or policy-enforcement points, which, with respect to the data flow, are upstream from the policy-enforcement point).

According to some examples, in step 204, the method includes using the metadata to determine which security operations have been performed on which data packets of the data flow. As shown in step 206, the determination in step 204 can include steps of (i) parsing the metadata from the data flow, (ii) verifying the attestations in the metadata, and (iii) associating the data packets with security operations indicated by the attestations.

According to certain non-limiting examples, step 204 can include parsing the metadata from the data flow; and determining which attestations in the metadata are associated with which of the data packets and which of the attestations are associated with which of the security operations. The attestations in the metadata can be cryptographical secure/verifiable information attesting to the security operations that have been applied to respective data packets of the data flow.

According to some examples, in step 208, the method includes determining security actions to be performed by the policy-enforcement point based on which security operations have been performed on which data packets of the data flow, as determined in step 204. The security actions to be performed can be based on other relevant information in addition to the security operations that have previously been performed on the data flow. The other relevant information can include, e.g., an identity of a user that originated the data flow, an identity of an application that originated the data flow, the protocol of a data packet (e.g., UDP or TCP), a source address of the data packet, a source port of the data packet, a destination address of the data packet, and/or a destination port of the data packet.

According to certain non-limiting examples, the security actions can include one or more of action 210, action 212, or action 214.

According to some examples, action 210 can include dropping the data packets or allowing the data packets through the policy-enforcement point depending on whether the previously performed security operations satisfy specified security criteria.

According to some examples, action 212 can include correcting for security deficiencies in upstream processing, e.g., by performing additional security operations at the policy-enforcement point, when the arriving data packets do not satisfy the security criteria.

According to some examples, action 214 can include avoiding redundant processing by omitting security operations at the policy-enforcement point, when the arriving data packets have already undergone the security operations or equivalents and, optionally, apply other security operations in place of the omitted security operations.

According to some examples, action 216 can include performing dynamic load balancing. For example, dynamic load balancing can be achieved by performing security operations at the policy-enforcement point for those data packets on which upstream nodes did not perform the security operations. Additionally or alternatively, dynamic load balancing can be achieved by dividing the security operations among the upstream nodes and the policy-enforcement point and signaling said division to the upstream nodes.

According to certain non-limiting examples, the security actions can include determining that one or more additional security operations are required for the data packets to be allowed into a workload, and performing, at the policy-enforcement point, the one or more additional security operations on the data packets for which the one or more additional security operations are required. When processing resources are scarce at the policy-enforcement point, the policy-enforcement point can perform the additional security operations on some of the data packets and drop the remainder of the data packets, depending on available processing resources at the first policy-enforcement point.

Additionally, the security actions can include determining, for future data packets of the data flow, a load balancing that includes a division of the one or more additional security operations between the first policy-enforcement point and upstream nodes of the network (e.g., nodes that, with respect to the data flow, are upstream from the first policy-enforcement point); and signaling, to the upstream nodes, the division of the one or more additional security operations.

According to some examples, in step 218, the method includes applying the determined security actions at the policy-enforcement point at step 218.

According to certain non-limiting examples, the given policy-enforcement point can adapt security actions based on what security operations have been performed upstream on a data flow. For example, in a distributed security fabric, security operations can be performed at various nodes or policy-enforcement points of a network. Each node that performs security operation(s) to some or all of the data packets flowing through that node, can add attestable metadata to the data flow, such that downstream nodes can determine what security operations have and have not been applied to which data packets. A policy-enforcement point can then use this metadata to determine what security actions to take on the data flow.

For example, if the default at a given policy-enforcement point is to perform a web application firewall (WAF) function on all data packets but the metadata indicates that the WAF function has already been performed, then the given policy-enforcement point can forgo performing the WAF function.

Additionally or alternatively, the WAF function may have been performed on a subset of data packets in the data flow. For example, an upstream node may only have computational/processing resources to perform the WAF function on some, but not all, data packets passing through the upstream node, or the data flow through the policy-enforcement point may include data packets that have been routed through different upstream nodes, only some of which perform the WAF function. In this case, the policy-enforcement point can use the metadata to determine which security operations have been performed on which of the data packets, and thereby perform the missing security operations only on those data packets on which the missing security operations have not been performed to avoid redundant processing.

Further, the security-chain information in the metadata (e.g., which security operations have been performed on which data packets) can be used to achieve a form of dynamic load balancing. For example, as the amount of traffic fluctuates, a particular device/node in the network might be able to perform a WAF function on all the data packets when the traffic volume is low, but the particular device/node may only have processing resources to perform the WAF function on a subset of the data packets when the traffic volume is high. At a downstream device/node there may be sufficient processing resources to perform the WAF function on the remaining data packets of the data flow. For example, a downstream device/node may have a low traffic volume or may have reserve processing resources.

According to certain non-limiting examples, metadata can be communicated with the payload of data packets to signal what security operations have already been performed to a data flow along the security service. This information is communicated using attestable metadata, meaning that there are cryptographically secure methods of verifying/validating the attested information. The data flow propagates through nodes in a network fabric, and one or more of these nodes can perform security operations, such that the data flow effectively goes through each security operation in a service chain. And as the data flow undergoes these security operations metadata can be added to the packets, attesting to what operations have been performed.

According to certain non-limiting examples, as the data flow goes through a web application firewall (WAF) function, attestable metadata indicating which WAF function was performed can be added to the data flow, and this attestable metadata can be used by downstream network components to provide security-chaining context for the data flow. As the data flow is transmitted downstream, the data flow is processed by a subsequent network component, which performs other security operation, such as L7 firewall functions, and attestable metadata indicating which L7 firewall functions were performed can be added to the data flow, and so on. Eventually, the data flow arrives at a policy-enforcement point that can use the information in the metadata that attests to the upstream security operation, and the policy-enforcement point can use this information to decide what action to take with respect to the data flow. For example, the policy-enforcement point can be a data processing unit (DPU), and the DPU can look at the attestable metadata and learn that, a WAF operation was already performed on this by an extended Berkley packer filter (eBPF) agent, which is upstream. Thus, the WAF function does not need to be repeated at the DPU, freeing up bandwidth for the DPU to perform other security operation other than the WAF function.

Figure 3:
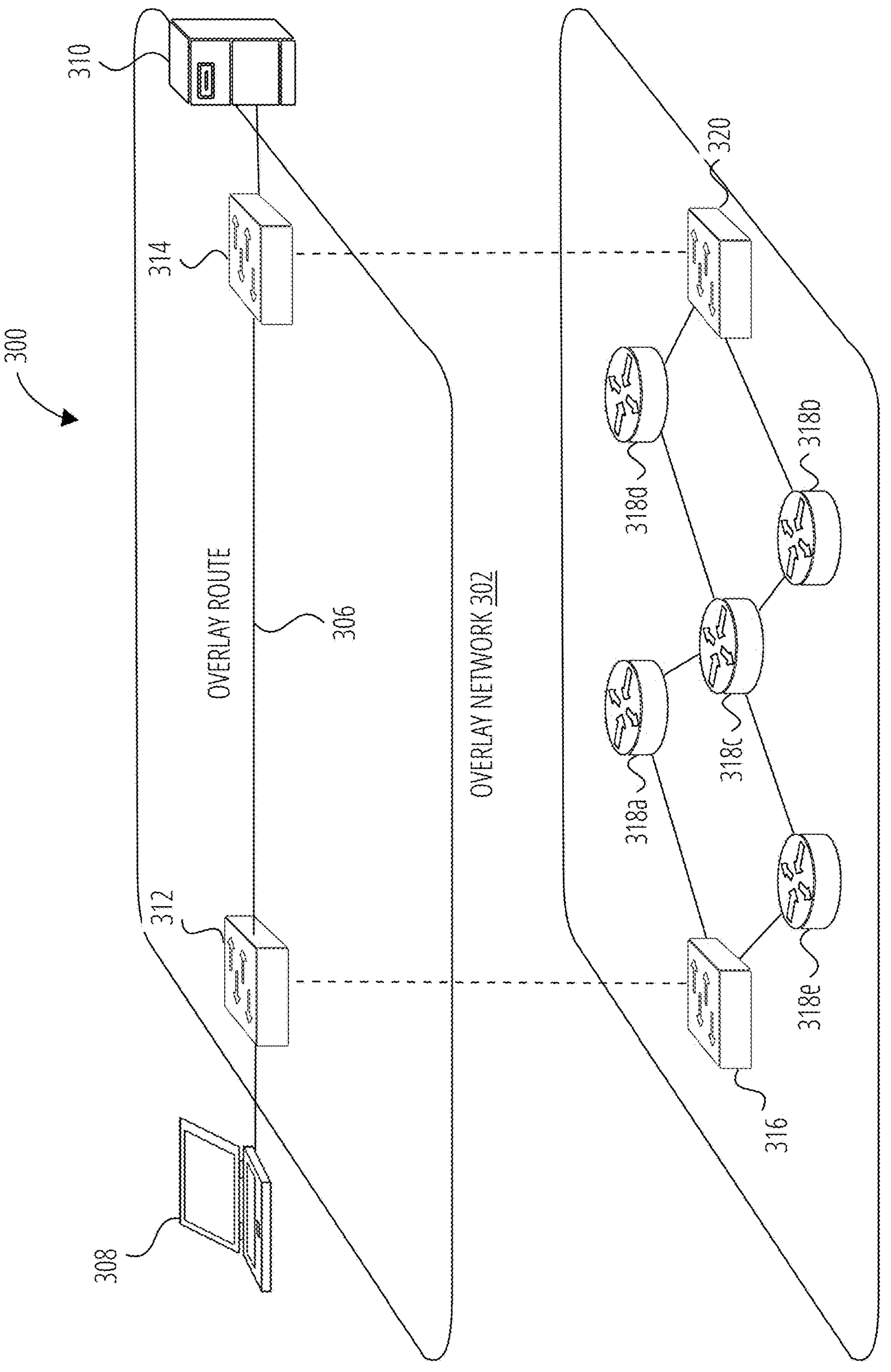
FIG. 3 illustrates an example of an overlay network on an underlay network, in accordance with some embodiments.

FIG. 3 illustrates a system 300 that includes an overlay network 302, which is a virtual network, that operates on an underlay network 304, which is an actual, physical network. Virtual, overlay networks can be used to implement encapsulation protocols such as VXLAN packets, Generic Routing Encapsulation (GRE) or Generic UDP Encapsulation (GUE) to encapsulate data and send it through a overlay route 306.

For example, GRE is a tunneling protocol that can encapsulate a wide variety of network layer protocols inside virtual point-to-point links or point-to-multipoint links over an Internet Protocol network. GUE provides encapsulation of user data (Application layer) into a UDP datagram (Transport layer) over IP (Network layer) inside some Data link layer protocol. Generic Network Virtualization Encapsulation (Geneve) is a network encapsulation protocol created by the IETF in order to unify the efforts made by other initiatives like VXLAN and NVGRE, with the intent to eliminate the wild growth of encapsulation protocols.

In FIG. 3, overlay network 302 can include virtual switch 312 that corresponds to a physical switch 316 and receives ingress data from a source node 308 (e.g., a user device, such as a laptop or smart phone) encapsulates data and sends it through overlay route 306 to virtual switch 314. Virtual switch 314 corresponds to a physical switch 320 and decapsulates the received encapsulated data. After decapsulation, virtual switch 314 sends data to destination node 310 (e.g., a server).

In FIG. 3, underlay network 304 can include a physical switch 316, a physical switch 320, and a series of routers (e.g., router 318*a*, a router 318*b*, a router 318*c*, a router 318*d*, and a router 318*c*) that make up a network fabric.

According to certain non-limiting examples, overlay network 302 can be a VXLAN overlay network. The virtual switch 312 and virtual switch 314 can be VXLAN Tunnel EndPoints (VTEPs) that provide connectivity between overlay network 302 and underlay network 304 networks. The VTEP can perform frame encapsulation into VXLAN packets to transport them across IP networks (e.g., the underlay network 304) and perform de-encapsulation upon exiting the VXLAN channel (e.g., overlay route 306). The underlay network 304 can operate without any awareness of the VXLAN. That is, the underlay network 304 treats the VXLAN packet just like any other normal packet. The VTEPs can be hardware based (e.g., using CISCO Nexus 9000 switch series) or software based (e.g., VXLAN capable hypervisor switch in hypervisor host). For example, a hypervisor host can be instantiated in a host of a data processing unit (DPU). The VTEPs can have two interfaces: (i) a local LAN interface and an IP interface. The local LAN interface can provide local communication by bridging endpoints (e.g., source node 308 or the destination node 310) connected to VTEPs. The IP interface can connect the underlay layer 3 network also known as transport network. The IP address are bound to the IP interface to uniquely identify VTEP in the network.

The overlay network 302 and underlay network 304 can operate independently of each other. Overlay network 302 is virtual and requires the underlay network 304 to function. Changes made in the overlay network 302, however, do not impact the underlay network 304. For example, links can be added/removed in the underlay network as long as destination is reachable by routing protocol overlay network remains unchanged.

Returning to the non-limiting VXLAN example, encapsulation (decapsulation) of VXLAN traffic can be done by the VTEPs adding (removing) additional fields. These additional field can include, e.g., (i) an external MAC address (e.g., tunnel endpoint VTEP destination media access control address); (ii) an external source MAC address (e.g., tunnel VTEP source Mac address); (iii) an external destination IP address (e.g., tunnel endpoint VTEP destination IP address); (iv) an external source IP address (e.g., tunnel VTEP source IP address); and (v) an external UDP header (e.g., UDP port: 4789). VXLAN can act as an extension for VLAN (layer 2) and extend layer 2 segments so tenant workload can be distributed across physical pods in data centers. VXLAN can provides 24-bit segment ID referred as VXLAN network identifier (VNID) to enable 16 million VXLAN segments. VXLAN can transmit packets through underlay network based on layer 3 header and it takes advantage of layer 3 routing, ECMP routing and all other available routing protocols to use all paths.

VXLAN is discussed here to illustrate one non-limiting example of network virtualization. Generally, there are many examples of network virtualization, such as GRE, GUE, and Geneve. For example, a description of Geneve can be found in RFC-8926, available at https://datatracker.ietf.org/doc/rfc8926/, which is hereby incorporated in its entirety. A person of ordinary skill in the art would understand, that when the systems and methods disclosed herein use network virtualization, any of the available techniques can be used.

According to certain non-limiting examples, virtual switch 312 and the virtual switch 314 can be implemented in hosts on DPUs that are proximate (within the network) to source node 308 and destination node 310

Figure 4:
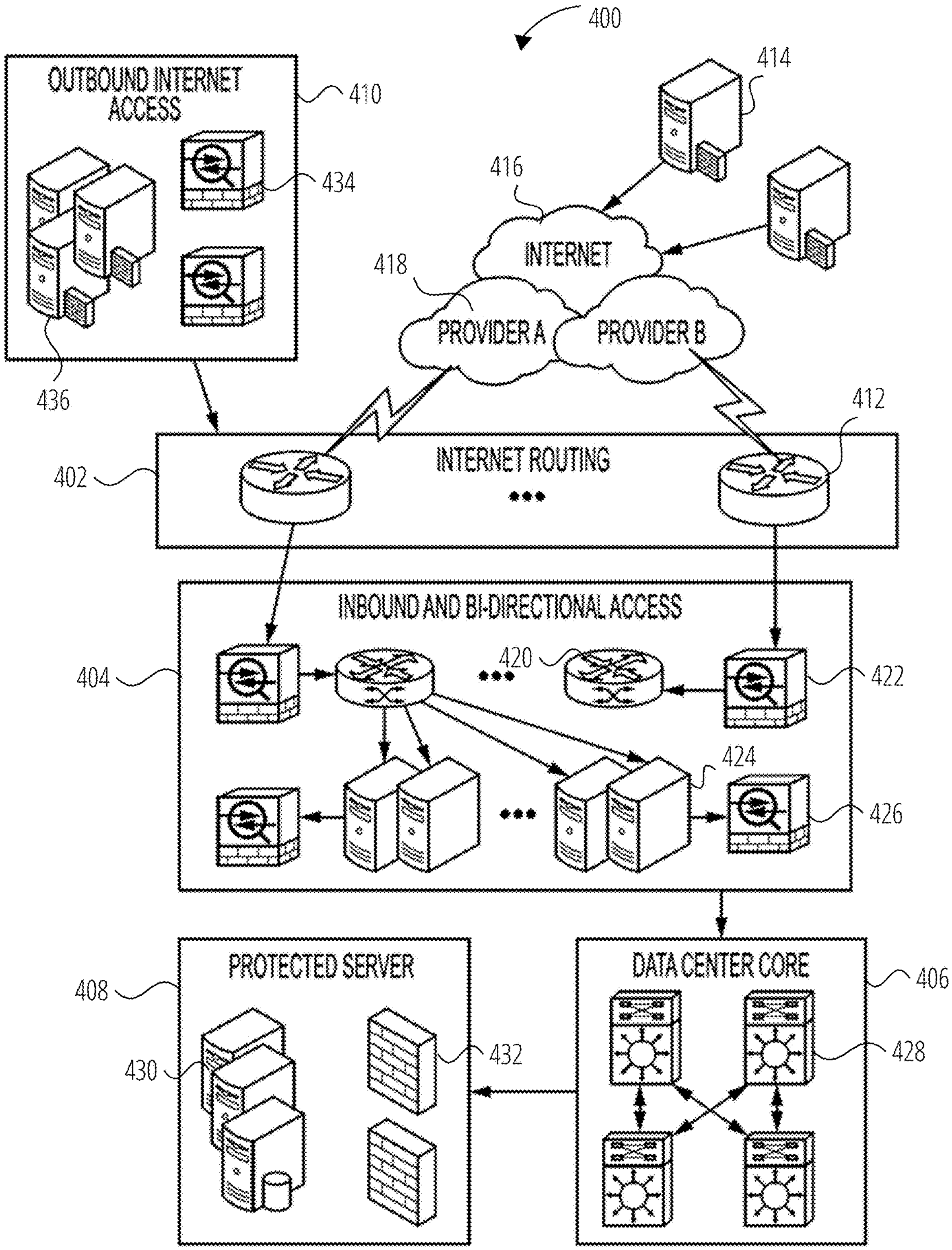
FIG. 4 illustrates a block diagram of an example of a network that implements the dynamically programmed security operations in network components that are placed in front of respective workloads, in accordance with some embodiments.

FIG. 4 illustrates a block diagram of one non-limiting example of an internet edge security framework 400 that includes internet routing 402, inbound and bi-directional access 404, a data center core 406, a back-end protected server (e.g., protected server 408), and outbound internet access 410. Internet edge security framework 400 exemplifies several aspects of security principles that are applicable for cloud computing, such as in secure web and/or e-commerce design. The various load balancers, servers, routers, firewalls, and switches illustrated in internet edge security framework 400 can function as nodes in the network that apply security operations to the data flow, and metadata representing which security operations are performed on which data packets can be encoded with the data flow. For example, the various network components in FIG. 4 can function a policy-enforcement points within the network that can be used to apply security operations to a data flow and encoded attestations of the security operations in the metadata that accompanies the data flow, in accordance with the systems and methods disclosed herein.

According to certain non-limiting examples, the proxy server 414 can be a global web cache proxy server that provides enhanced website response to clients within the world wide web (WWW) and provides additional denial of service (DOS) protection and flooding protection. Traffic from the proxy server 414 is conducted through the internet 416 via one or more providers 418. The internet routing can be provided by router 412, which can be multi-homed border gateway protocol (BGP) internet routers. Further, internet routing 402 can provide border gateway protocol (BGP) transit autonomous system AS prevention mechanisms such as filtering, no-export community value.

According to certain non-limiting examples, inbound and bi-directional access 404 can be an external demilitarized zone (DMZ) that provides, e.g., external firewalls (e.g., ingress firewall 422) and/or intrusion prevention system (IPS). For example, inbound and bi-directional access 404 can provide protection to public Internet Protocol (IP) addressed dedicated, internally un-routable address spaces for communications to load balancers and server untrusted interfaces. The inbound and bi-directional access 404 can be tuned to provide additional transmission control protocol (TCP) synchronize message (SYN) flooding and other DoS protection. In addition to providing reconnaissance scanning mitigation, the IPS service modules (e.g., provided by the load balancer 420) can protect against man-in-the-middle and injection attacks.

The load balancers 420 can provide enhanced application layer security and resiliency services in terminating HTTPS traffic and communicating with front-end web servers 424 on behalf of external clients. For example, external clients do not initiate a direct TCP session with front-end web servers 424. According to certain non-limiting examples, only front-end web servers 424 receive requests on untrusted interfaces, and front-end web servers 424 only make requests to back-end servers 430 on trusted interfaces. Data center core 406 can include several route switch processors route switch processor 428.

The protected server 408 is protected by the back-end firewall 432 and IPS to provide granular security access to back-end databases. The protected server 408 protects against unauthorized access and logs blocked attempts for access.

According to certain non-limiting examples, the internet edge security framework 400 provides defense in depth. Further, internet edge security framework 400 can advantageously use a dual-NIC (network interface controller) configured according to a trusted/un-trusted network model as a complement to a layered defense in depth approach.

According to certain non-limiting examples, internet edge security framework 400 can include a DMZ environment (e.g., inbound and bi-directional access 404), which can be thought of as the un-trusted side of the infrastructure. Front-end web servers 424 can have a network interface controller (NIC), which includes ingress firewall 422 and through which requests are received from outside of internet edge security framework 400. Additionally, servers can be configured with a second NIC (e.g., egress firewall 426) and can connect to a trusted network (e.g., protected server 408) that is configured with an internal address. According to certain non-limiting examples, firewall services can be provided for protected server 408, which is an area of higher trust. Front-end web servers 424 can make back-end requests on egress firewall 426. According to certain non-limiting examples, front-end web servers 424 can limit receiving requests to the un-trusted NIC, and front-end web servers 424 can limit making requests to the trusted NIC.

According to certain non-limiting examples, an additional layer of protection can be added by placing a load balancer (e.g., load balancer 420) in front of front-end web servers 424. For example, load balancers 420 can terminate TCP sessions originating from hosts on the internet. Further, load balancers 420 can act as proxies, and initiate another session to the appropriate virtual IP (VIP) pool members, thereby advantageously providing scalability, efficiency, flexibility, and security.

Further regarding internet routing 402, router 412 can provide IP filtering. For example, firewalls can be integrated with router 412. These firewalls can filter out traffic and reduce the footprint of exposure. For example, router 412 can be used to filter addresses. Further, router 412 and/or ingress firewall 422 can be used to perform ingress filtering to cover multi-homed networks. Additionally or alternatively, router 412 can provide some basic spoofing protection, e.g., by straight blocking large chunks of IP space that are not used as source addresses on the internet. Depending on its capacity, router 412 can be used to provide some additional filtering to block, e.g., blacklisted IP blocks. Additionally or alternatively, router 412 can provide protection against BGP attacks.

In addition to using dual NICs, the internet edge security framework 400 further illustrates using two separate environments on two different firewall pairs and/or clusters (e.g., a front-end environment such as the inbound and bi-directional access 404 and a back-end environment such as protected server 408. According to certain non-limiting examples, the internet edge security framework 400 can use a simplified architecture with a high availability (HA) firewall pair for the front end and a separate HA firewall pair for the back end. The back-end environment can include the databases and any other sensitive file servers.

For example, inbound web requests can have the following structure: End host sources secure SSL session=>(Internet Cloud)=>Edge Routers=>Edge Firewall un-trusted DMZ=> (optional) Load Balancer=>Un-trusted web server NIC=/=Trusted web server NIC initiates a database fetch to the back end server=>Edge firewall trusted DMZ=>Data center network core=>Back-End firewall=>High security database DMZ server.

Regarding outbound internet access 410, the internet edge security framework 400 can use a web proxy solution to provide internet access for internal clients. The outbound internet access 410 can include outbound firewalls 434 and outbound proxy servers 436. The outbound proxy servers 436 can provide web filtering mechanisms, internet access policy enforcement and most provide some flavor of data loss prevention, SSL offloading, activity logging, and audit capabilities, for example. In the reverse fashion from the inbound connectivity module, proxy servers can receive requests on trusted interfaces and can make requests on un-trusted interfaces.

Figure 5A:
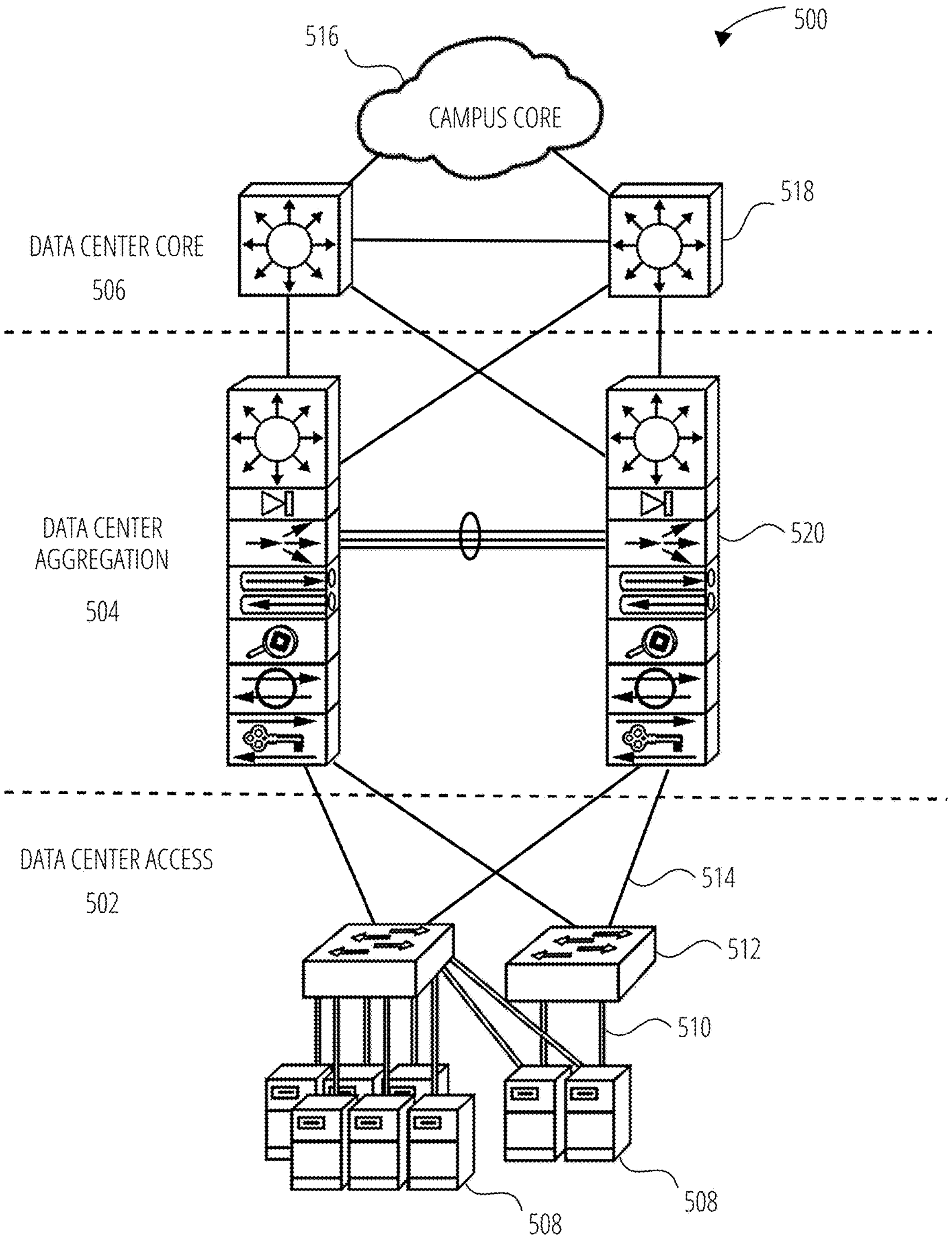
FIG. 5A illustrates a block diagram of an example of a network having an access cluster in the access layer, in accordance with some embodiments.

FIG. 5A illustrates a first non-limiting example of a multi-tier data center (for example, data center 500), which includes data center access 502, data center aggregation 504, and data center core 506. The data center 500 provides computational power, storage, and applications that can support an enterprise business, for example. The data center 500 can provide an IP fabric for routing data flows between a source and a destination in accordance with the systems and methods disclosed herein.

Further, the network components in data center 500 can include the functionality of policy-enforcement points that apply security operations to the data flow, and metadata representing which security operations are performed on which data packets can be encoded with the data flow. For example, the various network components in FIG. 5A and FIG. 5B can function a policy-enforcement points within the network that can be used to apply security operations to a data flow and encoded attestations of the security operations in the metadata that accompanies the data flow, in accordance with the systems and methods disclosed herein.

The network design of the data center 500 can be based on a layered approach. The layered approach can provide improved scalability, performance, flexibility, resiliency, and maintenance. As shown in FIG. 5A, the layers of the data center 500 can include the core, aggregation, and access layers (for example, data center core 506, data center aggregation 504, and data center access 502).

The data center core 506 layer provides the high-speed packet switching backplane for all flows going in and out of data center 500. Data center core 506 can provide connectivity to multiple aggregation modules and provides a resilient Layer 3 routed fabric with no single point of failure. Data center core 506 can run an interior routing protocol, such as Open Shortest Path First (OSPF) or Enhanced Interior Gateway Routing Protocol (EIGRP), and load balances traffic between the campus core and aggregation layers using forwarding-based hashing algorithms, for example.

The data center aggregation 504 layer can provide functions such as service module integration, Layer 2 domain definitions, spanning tree processing, and default gateway redundancy. Server-to-server multi-tier traffic can flow through the aggregation layer and can use services, such as firewall and server load balancing, to optimize and secure applications. The smaller icons within the aggregation layer switch in FIG. 5A represents the integrated service modules. These modules provide services, such as content switching, firewall, SSL offload, intrusion detection, network analysis, and more.

The data center access 502 layer is where the servers physically attach to the network. The server components can be, e.g., 1RU servers, blade servers with integral switches, blade servers with pass-through cabling, clustered servers, and mainframes with OSA adapters. The access layer network infrastructure can include modular switches, fixed configuration 1 or 2RU switches, and integral blade server switches. Switches provide both Layer 2 and Layer 3 topologies, fulfilling the various server broadcast domain or administrative requirements.

The architecture in FIG. 5A is an example of a multi-tier data center, but server cluster data centers can also be used. The multi-tier approach can include web, application, and database tiers of servers. The multi-tier model can use software that runs as separate processes on the same machine using interprocess communication (IPC), or the multi-tier model can use software that runs on different machines with communications over the network. Typically, the following three tiers are used: (i) Web-server; (ii) Application; and (iii) Database. Further, multi-tier server farms built with processes running on separate machines can provide improved resiliency and security. Resiliency is improved because a server can be taken out of service while the same function is still provided by another server belonging to the same application tier. Security is improved. For example, an attacker can compromise a web server without gaining access to the application or database servers. Web and application servers can coexist on a common physical server, but the database typically remains separate. Load balancing the network traffic among the tiers can provide resiliency, and security is achieved by placing firewalls between the tiers. Additionally, segregation between the tiers can be achieved by deploying a separate infrastructure composed of aggregation and access switches, or by using virtual local area networks (VLANs). Further, physical segregation can improve performance because each tier of servers is connected to dedicated hardware. The advantage of using logical segregation with VLANs is the reduced complexity of the server farm. The choice of physical segregation or logical segregation depends on your specific network performance requirements and traffic patterns.

The data center access 502 includes access server clusters 508, which can include layer 2 access with clustering and NIC teaming. Access server clusters 508 can be connected via gigabit ethernet (GigE) connections (e.g., gigabit ethernet connection 510) to workgroup switches 512. The access layer provides the physical level attachment to the server resources and operates in Layer 2 or Layer 3 modes for meeting particular server requirements such as NIC teaming, clustering, and broadcast containment.

Data center aggregation 504 can include aggregation processor 520, which is connected via 10 gigabit ethernet connection 514 to data center access 502 layer.

The aggregation layer can be responsible for aggregating the thousands of sessions leaving and entering the data center. The aggregation switches can support, e.g., many 10 GigE and GigE interconnects while providing a high-speed switching fabric with a high forwarding rate. The aggregation processor 520 can provide value-added services, such as server load balancing, firewalling, and SSL offloading to the servers across the access layer switches. The switches of the aggregation processor 520 can carry the workload of spanning tree processing and default gateway redundancy protocol processing.

For an enterprise data center, data center aggregation 504 can contain at least one data center aggregation module that includes two switches (for example, aggregation processors 520). The aggregation switch pairs work together to provide redundancy and to maintain the session state. For example, the platforms for the aggregation layer include the CISCO CATALYST switches equipped with SUP720 processor modules. The high switching rate, large switch fabric, and ability to support a large number of 10 GigE ports are important requirements in the aggregation layer. Aggregation processors 520 can also support security and application devices and services, including, e.g.: (i) Cisco Firewall Services Modules (FWSM); (ii) Cisco Application Control Engine (ACE); (iii) Intrusion Detection; (iv) Network Analysis Module (NAM); and (v) Distributed denial-of-service attack protection.

The data center core 506 provides a fabric for high-speed packet switching between multiple aggregation modules. This layer serves as the gateway to the campus core 516 where other modules connect, including, For example, the extranet, wide area network (WAN), and internet edge. Links connecting data center core 506 can be terminated at Layer 3 and use 10 GigE interfaces to support a high level of throughput, performance, and to meet oversubscription levels. According to certain non-limiting examples, the data center core 506 is distinct from the campus core 516 layer, with different purposes and responsibilities. A data center core is not necessary, but is recommended when multiple aggregation modules are used for scalability. Even when a small number of aggregation modules are used, it might be appropriate to use the campus core for connecting the data center fabric.

The data center core 506 layer can connect, e.g., to campus core 516 and data center aggregation 504 layers using Layer 3-terminated 10 GigE links. Layer 3 links can be used to achieve bandwidth scalability, quick convergence, and to avoid path blocking or the risk of uncontrollable broadcast issues related to extending Layer 2 domains.

The traffic flow in the core can include sessions traveling between campus core 516 and aggregation processors 520. Data center core 506 aggregates the aggregation module traffic flows onto optimal paths to the campus core 516. Server-to-server traffic can remain within an aggregation processor 520, but backup and replication traffic can travel between aggregation processors 520 by way of data center core 506.

Figure 5B:
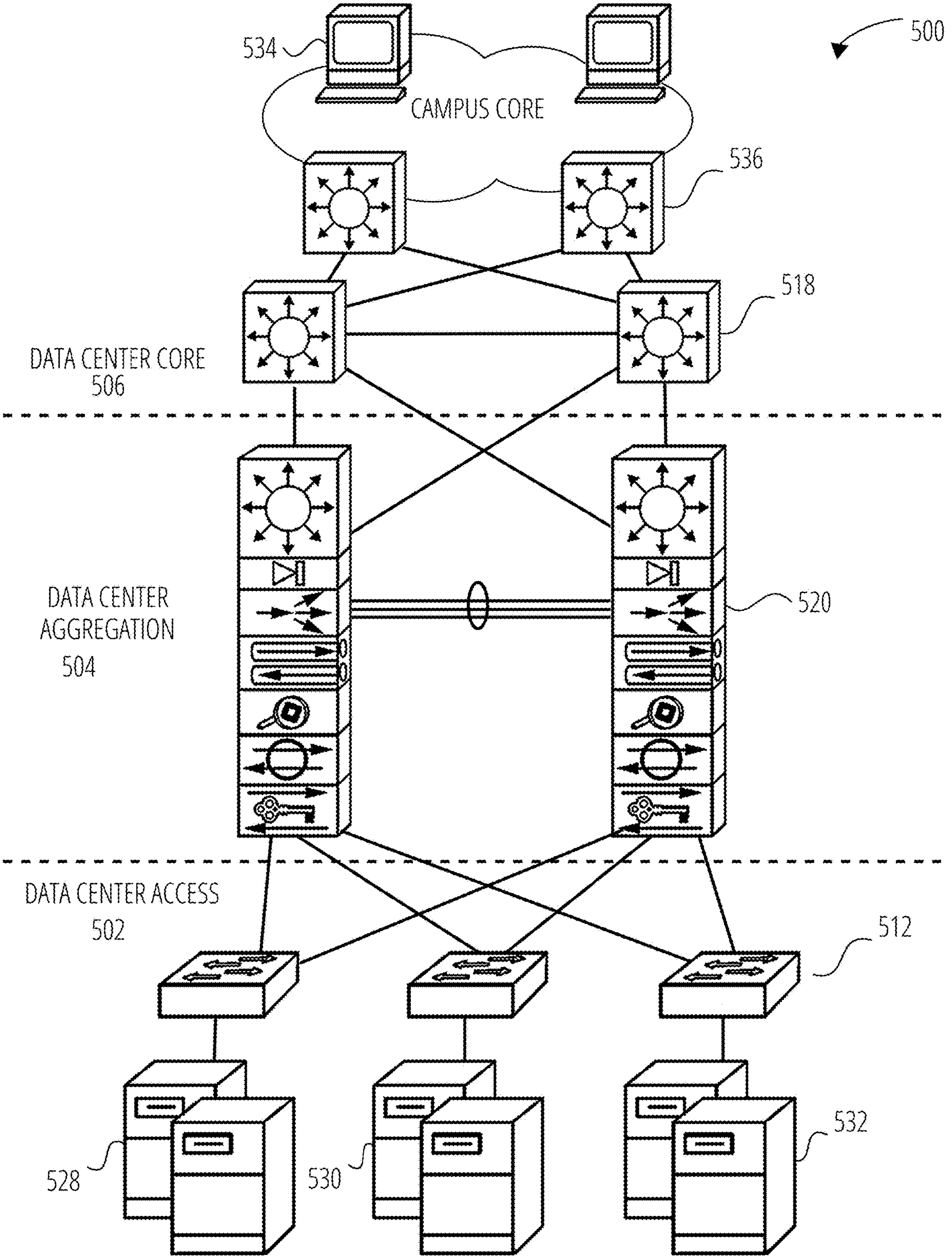
FIG. 5B illustrates a block diagram of an example of a network having respective servers (e.g., a web server, an application server, and a database server) in the access layer, in accordance with some embodiments.

FIG. 5B illustrates other aspects of data center 500. The connections among multilayer switches 518 and other multilayer switches 536 enable traffic flow in the data center core to the clients 534 in the campus core 516. The data center core 506 can connect to the campus core 516 and data center aggregation 504 layer using Layer 3-terminated 10 GigE links. Layer 3 links can be used to achieve bandwidth scalability, quick convergence, and to avoid path blocking or the risk of uncontrollable broadcast issues related to extending Layer 2 domains.

According to certain non-limiting examples, the traffic flow in the core consists primarily of sessions traveling between the campus core and the aggregation modules. The core aggregates the aggregation module traffic flows onto optimal paths to the campus core.

The traffic in the data center aggregation 504 layer primarily can include core layer to access layer flows. The core-to-access traffic flows can be associated with client HTTP-based requests to the web servers 528, the application servers 530, and the database servers 532. At least two equal cost routes exist to the web server subnets. The CISCO Express Forwarding (CEF)-based L3 plus L4 hashing algorithm determines how sessions balance across the equal cost paths. The web sessions might initially be directed to a VIP address that resides on a load balancer in the aggregation layer, or sent directly to the server farm. After the client request goes through the load balancer, it might then be directed to an SSL offload module or a transparent firewall before continuing to the actual server residing in the data center access 502.

Figure 6A:
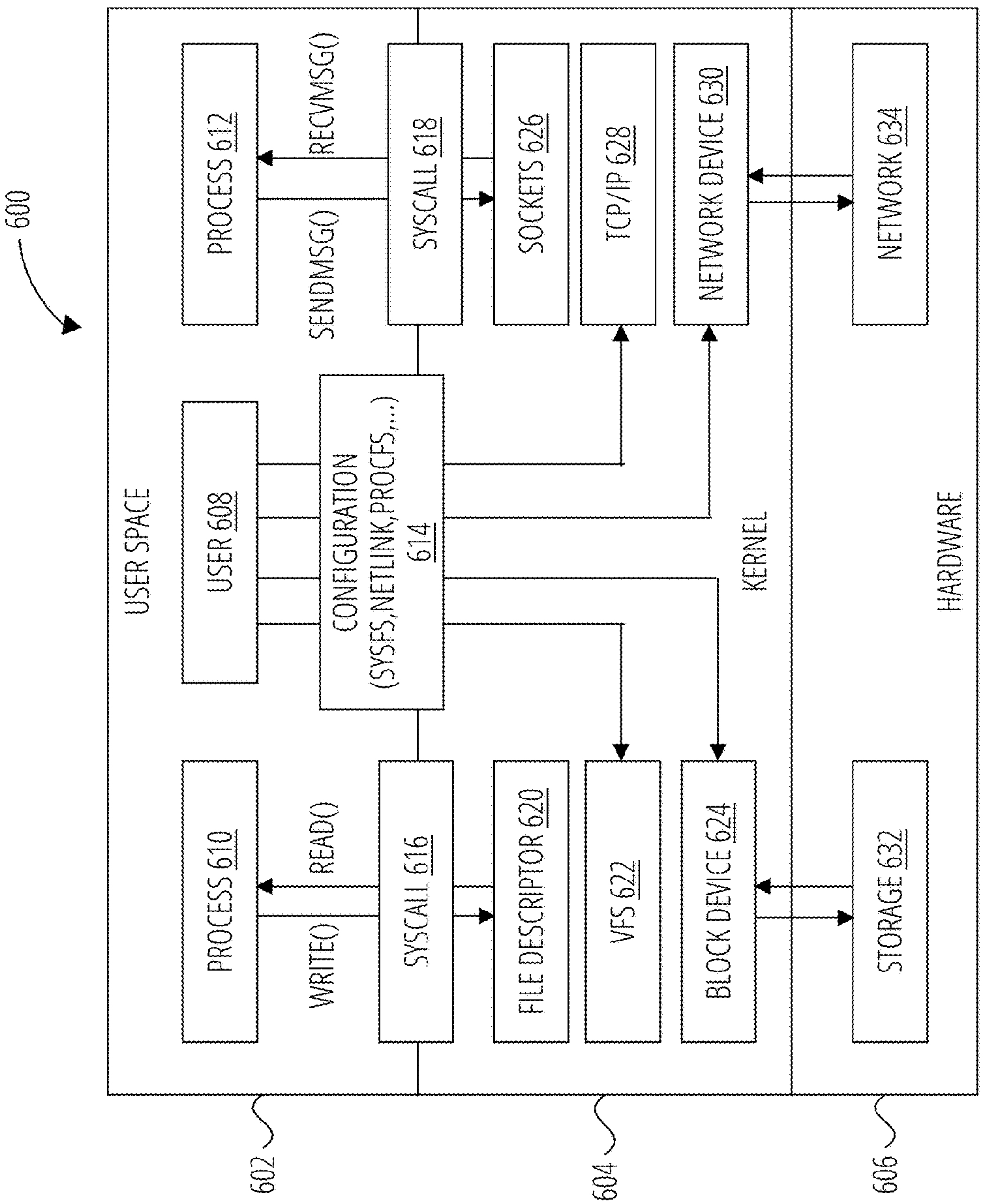
FIG. 6A illustrates an example of a block diagram of an extended Berkley packet filter (eBPF), in accordance with some embodiments.

FIG. 6A illustrates a non-limiting example of implementing extended Berkley pack filters (eBPF). The eBPF architecture 600 can be implemented on a central processing unit (CPU and includes a user space 602, kernel 604, and hardware 606. For example, the user space 602 can be a place where regular applications run, whereas the kernel 604 is where most operating system-related processes run. An eBPF in a processor at a node (e.g., a server or router) of the network can be used to apply security operations to a data flow, generate network data that is encoded in the metadata that accompanies the data flow, and the network data can include cryptographically provable/verifiable attestations regarding which security operations have been applied to the data flow. Further, the network data that is encoded in the metadata can include program traces and data types of system calls to kernel 604.

The kernel 604 can have direct and full access to the hardware 606. When a given application in user space 602 connects to hardware 606, the application can do so via calling APIs in kernel 604. Separating the application and the hardware 606 can provide security benefits. An eBPF can allow user-space applications to package the logic to be executed in the kernel 604 without changing the kernel code or reloading.

Since eBPF programs run in the kernel 604, the eBPF programs can have visibility across all processes and applications, and, therefore, they can be used for many things: network performance, security, tracing, and firewalls.

The user space 602 can include a process 610, a user 608, and process 612. The kernel 604 can include a file descriptor 620, a virtual file system (e.g., VFS 622), a block device 624, sockets 626, a TCP/IP 628, and a network device 630. The hardware 606 can include storage 632 and network 634.

eBPF programs are event-driven and are run when the kernel or an application passes a certain hook point. Predefined hooks include system calls, function entry/exit, kernel tracepoints, network events, and several others. If a predefined hook does not exist for a particular need, it is possible to create a kernel probe (kprobe) or user probe (uprobe) to attach eBPF programs almost anywhere in kernel or user applications. When the desired hook has been identified, the eBPF program can be loaded into the kernel 604 using the bpf system call (e.g., syscall 616 or syscall 618). This is typically done using one of the available eBPF libraries. The next section provides an introduction into the available development toolchains. Verification of the eBPF program ensures that the eBPF program is safe to run. It validates that the program meets several conditions (e.g., the conditions can be that the process loading the eBPF program holds the required capabilities/privileges; the program does not crash or otherwise harm the system; and the program always runs to completion).

A benefit of the kernel 604 is abstracting the hardware (or virtual hardware) and providing a consistent API (system calls) allowing for applications to run and share the resources. To achieve this, a wide set of subsystems and layers are maintained to distribute these responsibilities. Each subsystem can allow for some level of configuration (e.g., configuration 614) to account for different needs of users. Each subsystem can allow for some level of configuration to account for the different needs of users. When a desired behavior cannot be configured, the kernel 604 can be modified to perform the desired behavior. This modification can be realized in three different ways: (1) by changing kernel source code, which may take a long time (e.g., several years) before a new kernel version becomes available with the desired functionality; (2) writing a kernel module, which may require regular editing (e.g., every kernel release) and incurs the added risk of corrupting the kernel 604 due to lack of security boundaries; or (3) writing an eBPF program that realizes the desired functionality. Beneficially, eBPF allows for reprogramming the behavior of the kernel 604 without requiring changes to kernel source code or loading a kernel module.

Many types of eBPF programs can be used, including socket filters and system call filters, networking, and tracing. Socket filter type eBPF programs can be used for network traffic filtering, and can be used for discarding or trimming of packets based on the return value. XDP type eBPF programs can be used to improve packet processing performance by providing a hook closer to the hardware (at the driver level), e.g., to access a packet before the operative system creates metadata. Tracepoint type eBPF programs can be used instrument kernel code, e.g., by attaching an eBPF program when a "perf" event is opened with a command "perf_event_open(2)", then use the command "ioctl(2)" to return a file descriptor that can be used to enable the associated individual event or event group and to attach the eBPF program to the tracepoint event. Helper type eBPF programs can be used to determines which subset of in kernel functions can be called. Helper functions are called from within eBPF programs to interact with the system, to operate on the data passed as context, or to interact with maps.

Figure 6B:
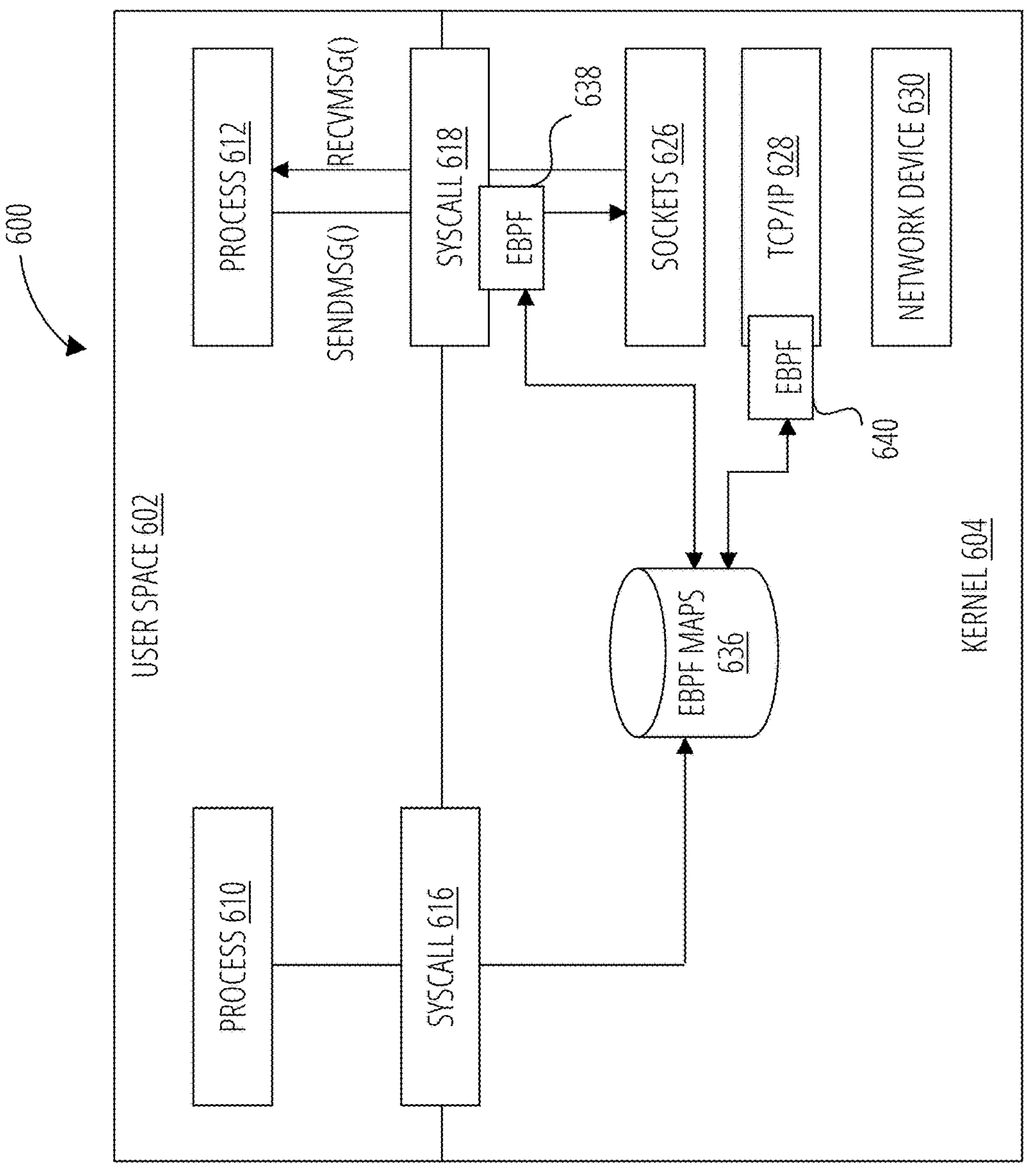
FIG. 6B illustrates an example of a block diagram of an eBPF map in an eBPF, in accordance with some embodiments.
Figure 6C:
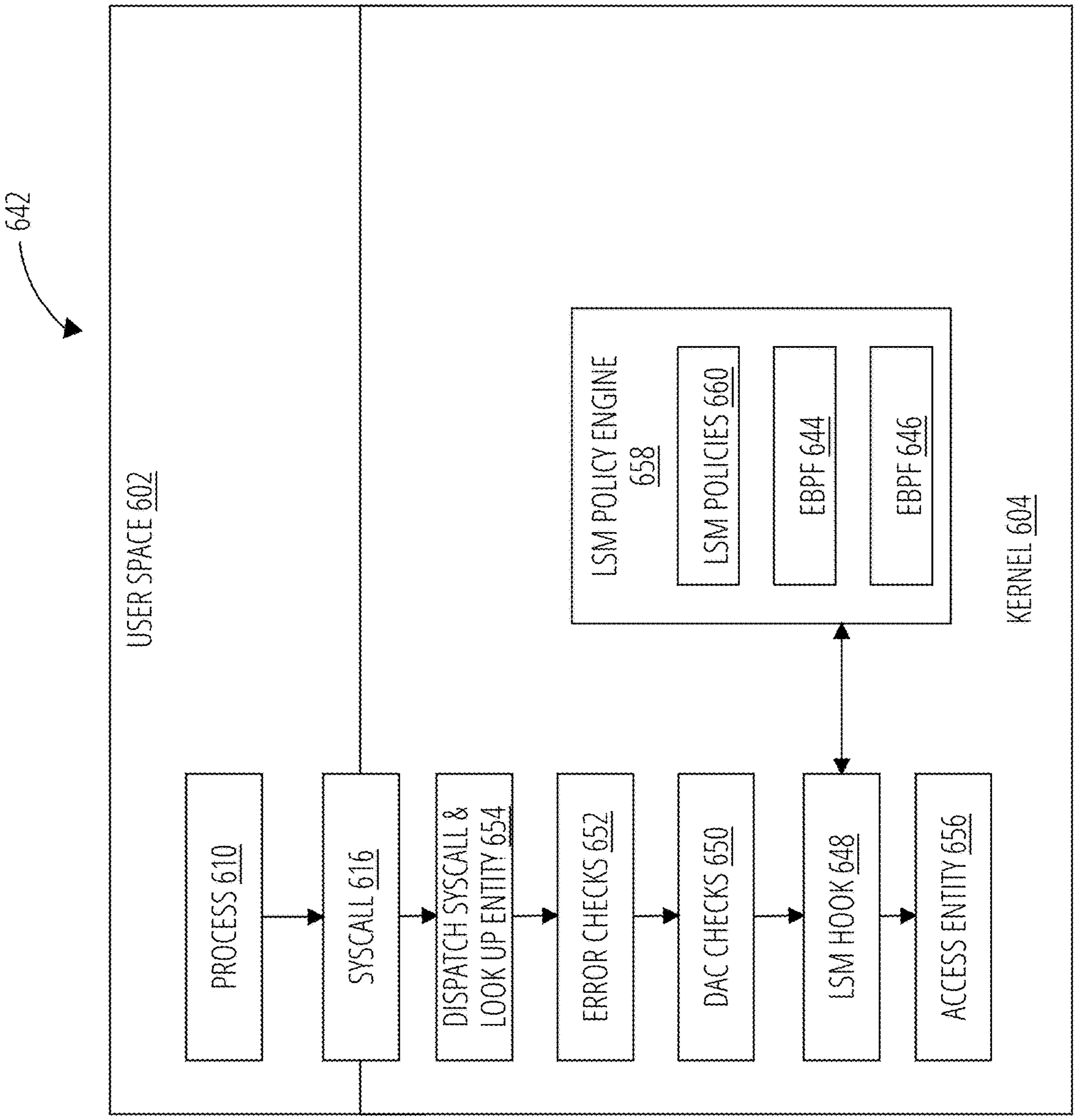
FIG. 6C illustrates a block diagram of an example of implementing Linus security module (LSM) hooks and Linus security module extended Berkley packet filter programs (LSM BPF), in accordance with some embodiments.

FIG. 6B illustrates just-in-time (JIT) compilation of eBPF programs. JIT compilation translates the generic bytecode of the program into the machine specific instruction set to optimize execution speed of the program. This makes eBPF programs run as efficiently as natively compiled kernel code or as code loaded as a kernel module.

An aspect of eBPF programs is the ability to share collected information and to store state information. For example, eBPF programs can leverage eBPF maps 636 to store and retrieve data in a wide set of data structures. The eBPF maps 636 can be accessed from eBPF program 638 and eBPF program 640 as well as from applications (e.g., process 610 and process 612) in user space 602 via a system call (e.g., syscall 616 and syscall 618). Non-limiting examples of supported map types include, e.g., hash tables, arrays, least recently used (LRU), ring buffer, stack trace, and longest prefix match (LPM), which illustrates the diversity of data structures supported by eBPF programs.

The eBPF architecture 642 illustrates the use a Linus security module (LSM) to implement network/security functions at an endpoint in a network fabric (e.g., in the kernel spaces of a server or a client device. As discussed above, a process 610 in user space 602 results in a syscall 616 to kernel 604, and syscall 616 causes a dispatch syscall & look up entity 654, where the entity can be, e.g., a file, socket, or inode. After performing error checking (e.g., error checks 652), kernel 604 consults the discretionary access control (DAC) mechanism (e.g., DAC checks 650), and kernel 604 then calls the hooks (e.g., LSM hook 648), including hooks for the minor modules if any are present, followed by the hooks of the major security module in place at the time. To allow for module stacking, the security modules are separated into major modules and minor modules. There can only be one major security module running in a given system, while minor modules can be stacked to provide different security features. Historically, major modules had access to opaque security blobs provided by the LSM framework while minor modules did not, but this distinction is fading with more recent kernel releases.

LSM policy engine 658 can include eBPF program 644, eBPF program 646, and LSM policies 660. LSM policies 660 can include AppArmor and/or SELinux. When a hook in LSM hook 648 is triggered by syscall 616, LSM policy engine 658 determines one or more actions (e.g., security operation to be applied). Like the 5-tuple rules discussed with reference to FIG. 2 can trigger respective actions (e.g., security operations), the hooks triggered at LSM hook 648 trigger respective actions, which are defined in LSM policy engine 658. These actions are defined in LSM policies 660, eBPF program 644, and/or eBPF program 646. There can be many different types of security hooks that trigger actions, including, e.g., security hooks for file system operations;
opening, creating, moving, and deleting files;
mounting and unmounting file systems;
task/process operations;
allocating and freeing tasks, changing task user and group identities;
socket operations;
creating and binding sockets;
receiving and sending messages;
program execution operations;
mount using fs_context;
filesystem operations;
inode operations;
kernfs node operations;
file operations;
task operations;
Netlink messaging;
Unix domain networking;
socket operations;
SCTP;
Infiniband;
XFRM operations;
individual messages held in System V IPC message queues;
System V IPC Message Queues;
System V Shared Memory Segments;
System V Semaphores;
Audit;
the general notification queue;
using the eBPF maps and programs functionalities through;
perf events; and
io_uring.

According to certain non-limiting examples LSM policy engine 658 can be implemented using Kernel Runtime Security Instrumentation (KRSI), which can also be referred to as BPF-LSM. For example, a BPF-LSM program can be executed in the kernel with parsed information from the manager from the enforcement part. The BPF-LSM program can follow the LSM framework rule: checking the condition and returning the result. 0 means pass (Allow), or error code means not pass (Deny). For example, the BPF-LSM program can perform the steps of: (i) before the BPF-LSM program is attached to a particular LSM hook, the BPF-LSM program imports necessary libraries and creates data structures and events that will be collected from the kernel; (ii) once the BPF-LSM program is attached to the specific LSM hook, the BPF-LSM program performs: (1) filtering, (2) kernel context pre-processing, (3) a condition phase, and (4) a policy action. In the filtering, filters matched containers to control the behaviors. In the kernel context pre-processing: the program receives a kernel context observed only in the kernel. For example, the BPF-LSM program can pre-process the contexts for the corresponding LSM hook due to resource problems. In the condition phase, the BPF-LSM program can parse conditions that are used by a policy. For example, the conditions can decide whether the system call is safe to process. In the policy action, the BPF-LSM program can check security with an action. For example, the policy can give back the results of the LSM function to the program, such that if the action is "Allow", the BPF-LSM program can return a value of "0," otherwise the BPF-LSM program can return a value of "−1." Policies in this system can be stackable to the old policies if the policy affects the same container.

According to certain non-limiting examples, when LSM policy engine 658 determines that accessing the entity (e.g., the entity can be a file, socket, or inode) is allowed, then the entity is accessed (e.g., access entity 656).

As discussed above, the LSM framework provides a modular architecture with built-in hooks in the kernel, allowing the installation of security modules to strengthen access control. The LSM framework can include at least four parts/components. First, the framework can include inserted calls to security hook functions at different key points in the kernel source code. Second, the framework can provide a generic security system call that allows security modules to write new system calls for security-related applications, styled similarly to the original Linux system call socketcall( ) which is a multiplex system call. Third, the framework can implement registration and deregistration functions so that access control policies can be implemented as kernel modules (e.g, implemented through security_add_hooks and security_delete_hooks). Fourth, the framework can transform most of the capabilities logic into an optional security module.

According to certain non-limiting examples, the LSM framework controls operations on kernel objects by providing a series of hooks using the hook injection method. In the example of accessing the file open function process, the access diagram of hook functions can be implemented by: (1) after entering the kernel through a system call, the system performs an error check first; (2) once the error check passes, permission checks are performed (for example, Discretionary Access Control (DAC) checks); and (3) after passing the permission checks, Mandatory Access Control (MAC) is enforced. For example, the permission checks can be based on user IDs by allowing resource access once the user ID is verified. Further, MAC can provide a type of access control that prohibits subjects from interfering, utilizing security labels, information classification, and sensitivity to control access, determining access based on comparing the subject's level and the sensitivity of the resource.

Figure 7:
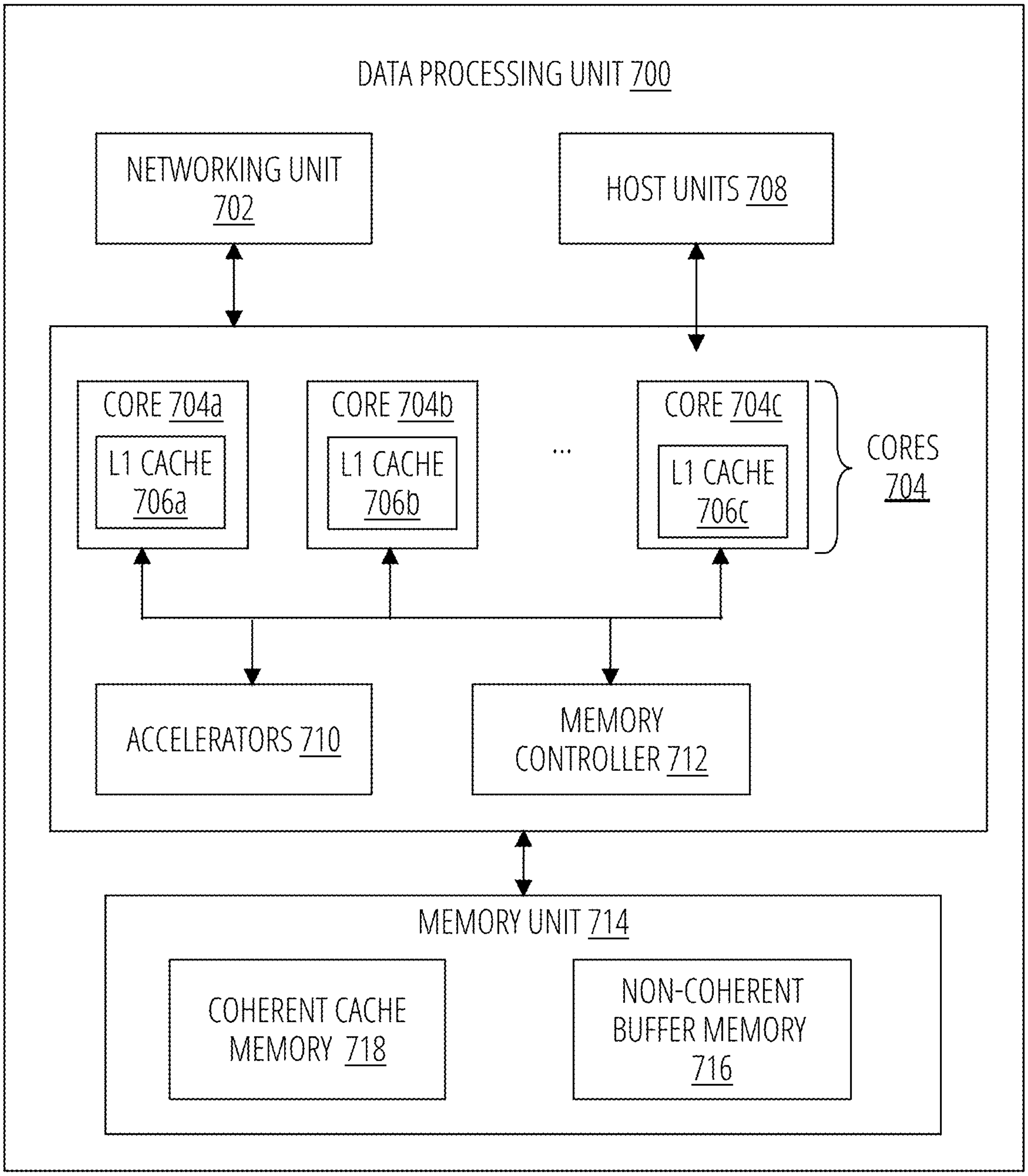
FIG. 7 illustrates an example of a block diagram of a data processing unit (DPU), in accordance with some embodiments.

A non-limiting example of a data processing unit (DPU) is illustrated in FIG. 7. The DPU 700 can include two or more processing cores, for example. DPU 700 can be a hardware chip that is implemented in digital logic circuitry and can be used in any computing or network device. The DPU 700 can include the functionality of a policy-enforcement point to apply security operations to the data flow and add to the data flow metadata representing which security operations are performed on which data packets. For example, DPU 700 can encode attestations of the security operations in the metadata, which can be included in the header of the data packets in the data flow, in accordance with certain embodiments of the systems and methods disclosed herein.

DPU 700 can receive and transmit data packets via networking unit 702, which can be configured to function as an ingress port and egress port, enabling communications with one or more network devices, server devices (e.g., servers), random access memory, storage media (e.g., solid state drives (SSDs)), storage devices, or a data center fabric. The ports can include, e.g., a PCI-e port, Ethernet (wired or wireless) port, or other such communication media. Additionally or alternatively, DPU 700 can be implemented as an application-specific integrated circuit (ASIC), can be configurable to operate as a component of a network appliance or can be integrated with another DPUs within a device.

In FIG. 7, e.g., DPU 700 can include a plurality of programmable processing, e.g., core 704*a*, core 704*b* . . . , core 704*c* (collectively referred to as "cores 704") and each of the cores 704 can include an L1 cache (e.g., L1 cache 706*a*, L1 cache 706*b*, . . . , L1 cache 706*c*). DPU 700 can include a memory unit 714. Memory unit 714 can include different types of memory or memory devices (e.g., coherent cache memory 718 and non-coherent buffer memory 716). In some examples, cores 704 can include at least two processing cores. DPU 700 also includes a networking unit 702, host units 708, a memory controller 712, and accelerators 710. Each of cores 704, networking unit 702, memory controller 712, host units 708, accelerators 710, and memory unit 714 including coherent cache memory 718 and non-coherent buffer memory 716 can be connected to allow communication therebetween.

Cores 704 can comprise one or more of MIPS (microprocessor without interlocked pipeline stages) cores, ARM (advanced RISC (reduced instruction set computing) machine) cores, PowerPC (performance optimization with enhanced RISC-performance computing) cores, RISC-V (RISC five) cores, or CISC (complex instruction set computing or x86) cores. Each of cores 704 can be programmed to process one or more events or activities related to a given data packet such as, For example, a networking packet or a storage packet. Each of cores 704 can be programmable using a high-level programming language, e.g., C or C++.

The use of DPUs 700 can be beneficial for network processing of data flows. In some examples, cores 704 can be capable of processing data packets received by networking unit 702 and/or host units 708, in a sequential manner using one or more "work units." In general, work units are sets of data exchanged between cores 704 and networking unit 702 and/or host units 708.

Memory controller 712 can control access to memory unit 714 by cores 704, networking unit 702, and any number of external devices, e.g., network devices, servers, or external storage devices. Memory controller 712 can be configured to perform a number of operations to perform memory management in accordance with the present disclosure. In some examples, memory controller 712 can be capable of mapping a virtual address to a physical address for non-coherent buffer memory 716 by performing a number of operations. In some examples, memory controller 712 can be capable of transferring ownership of a cache segment of the plurality of segments from core 704*a* to core 704*b* by performing a number of operations.

DPU 700 can act as a combination of a switch/router and a number of network interface cards. For example, networking unit 702 can be configured to receive one or more data packets from and transmit one or more data packets to one or more external devices, e.g., network devices. Networking unit 702 can perform network interface card functionality, and packet switching.

Additionally or alternatively, networking unit 702 can be configured to use large forwarding tables and offer programmability. Networking unit 702 can advertise Ethernet ports for connectivity to a network. In this way, DPU 700 supports one or more high-speed network interfaces, e.g., Ethernet ports, without the need for a separate network interface card (NIC). Each of host units 708 can support one or more host interfaces, e.g., PCI-e ports, for connectivity to an application processor (e.g., an x86 processor of a server device or a local CPU or GPU of the device hosting DPU 700) or a storage device (e.g., an SSD). DPU 700 can also include one or more high bandwidth interfaces for connectivity to off-chip external memory (not illustrated in FIG. 7). Each of accelerators 710 can be configured to perform acceleration for various data-processing functions, such as look-ups, matrix multiplication, cryptography, compression, or regular expressions. For example, accelerators 710 can comprise hardware implementations of look-up engines, matrix multipliers, cryptographic engines, compression engines, or regular expression interpreters.

DPU 700 can improve efficiency over x86 processors for targeted use cases, such as storage and networking input/output, security and network function virtualization (NFV), accelerated protocols, and as a software platform for certain applications (e.g., storage, security, and data ingestion). DPU 700 can provide storage aggregation (e.g., providing direct network access to flash memory, such as SSDs) and protocol acceleration. DPU 700 provides a programmable platform for storage virtualization and abstraction. DPU 700 can also perform firewall and address translation (NAT) processing, stateful deep packet inspection, and cryptography. The accelerated protocols can include TCP, UDP, TLS, IPSec (e.g., accelerates AES variants, SHA, and PKC), RDMA, and iSCSI. DPU 700 can also provide quality of service (QoS) and isolation containers for data, and provide LLVM binaries.

DPU 700 can support software including network protocol offload (TCP/IP acceleration, RDMA and RPC); initiator and target side storage (block and file protocols); high level (stream) application APIs (compute, network and storage (regions)); fine grain load balancing, traffic management, and QoS; network virtualization and network function virtualization (NFV); and firewall, security, deep packet inspection (DPI), and encryption (IPsec, SSL/TLS)

Figure 8:
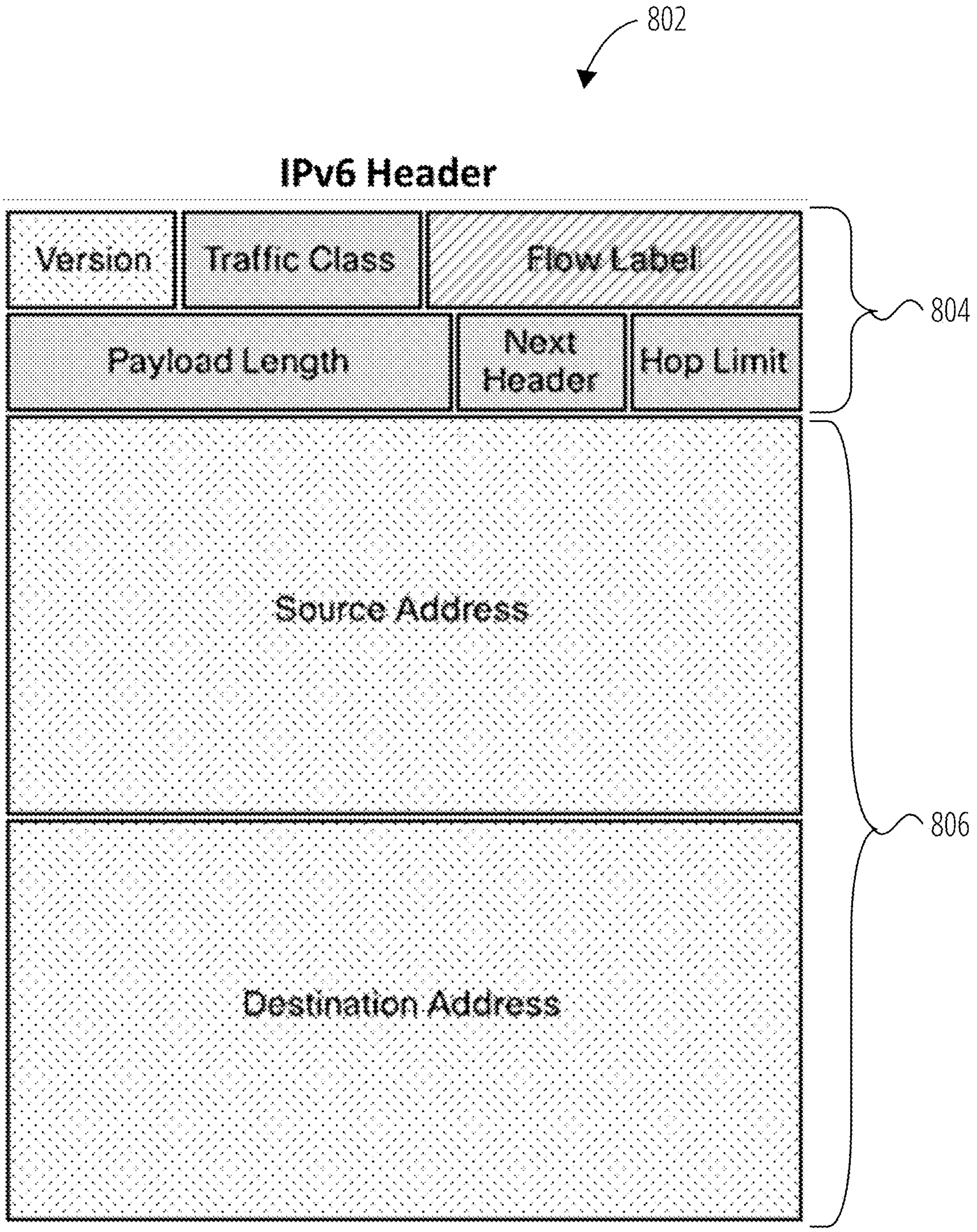
FIG. 8 illustrates an example of an IPV6 main header, in accordance with some embodiments.

FIG. 8 illustrates an Internet Protocol version 6 (IPv6) main header 802 for an IPV6 data packet, which is the smallest message entity exchanged using Internet Protocol version 6 (IPv6). Packets include headers main header 802 that have control information 804 and addressing information 806 for routing, and the packets include a payload of user data. The control information in IPv6 packets is subdivided into a mandatory fixed header (e.g., the main header 802) and optional extension headers. The payload of an IPV6 packet can be a datagram or segment of the higher-level transport layer protocol. Additionally or alternatively, the payload of an IPV6 packet can be data for an internet layer (e.g., ICMPv6) or link layer (e.g., OSPF) instead.

IPv6 packets can be transmitted over the link layer (for example, over Ethernet or Wi-Fi), which encapsulates each packet in a frame. Packets may also be transported over a higher-layer tunneling protocol.

Routers do not fragment IPv6 packets larger than the maximum transmission unit (MTU). A minimum MTU of 1,280 octets is used by IPv6. Hosts are recommended to use Path MTU Discovery to take advantage of MTUs greater than the minimum.

IPv6 is uses two distinct types of headers: (i) main header 802 and IPV6 Extension Headers. For example, the main header 802 can be similar to the basic IPv4 header despite some field differences that are the result of lessons learned from operating IPv4.

Figure 9A:
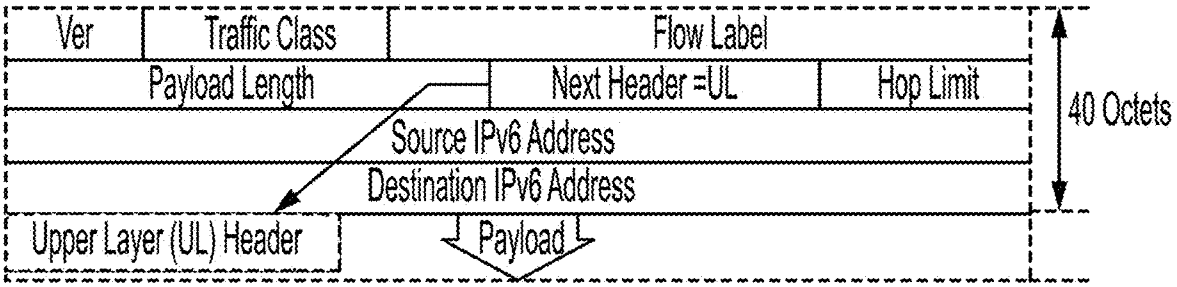
FIG. 9A illustrates an example of an IPV6 header, in accordance with some embodiments.
Figure 9B:
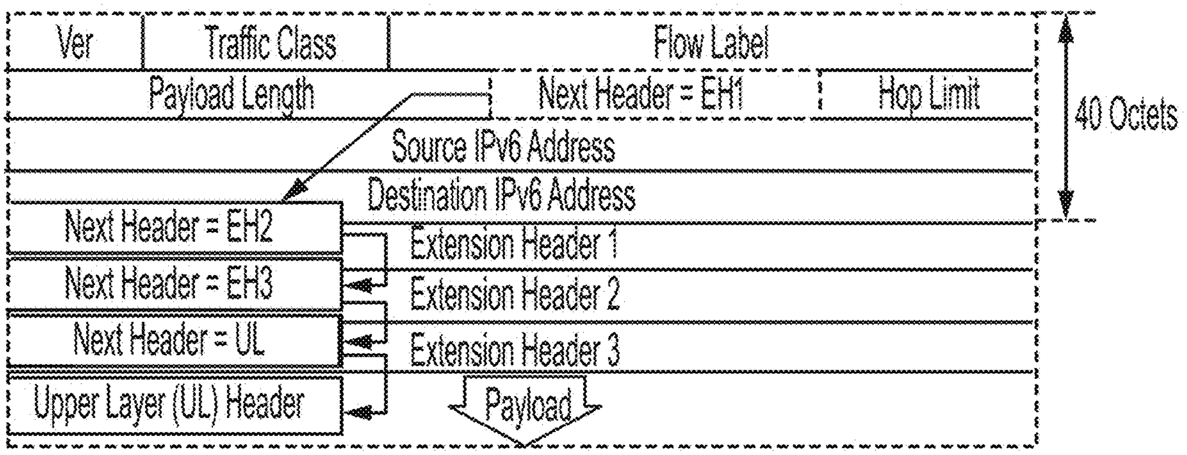
FIG. 9B illustrates an example of an IPv6 header with an optional extension header, in accordance with some embodiments.

In the main header, the field "Ver" can be a 4-bit Internet Protocol version number; the field "Traffic Class" can be a 8-bit traffic class field; the field "Flow Label" can be a 20-bit flow label. See section 6; the field "Payload Length" can be a 16-bit unsigned integer (e.g., this field can be the length of the IPV6 payload, representing the rest of the packet following this IPv6 header, in octets); the field "Next Header" can be a 16 8-bit selector. Identifies the type of header immediately following the IPV6 header; the field "Hop Limit" can be a 8-bit unsigned integer (e.g., this field can be decremented by 1 by each node that forwards the packet, and the packet is discarded if Hop Limit is decremented to zero); the field "Source Address" can be a 128-bit address of the originator of the packet; the field "Destination Address" can be a 128-bit address of the intended recipient of the packet FIG. 9A and FIG. 9B illustrate chaining extension headers (EHs) in IPv6. The main header 802 remains fixed in size (40 bytes) while customized EHs are added as needed. FIG. 9A and FIG. 9B show how the headers are linked together in an IPV6 packet. RFC-2460, which is hereby incorporated by reference in its entirety, defines the extension headers, as shown in FIG. 9C, along with the Next Header values assigned to them.

In IPV6, optional internet-layer information is encoded in separate headers that may be placed between the IPV6 header and the upper-layer header in a packet. There are a small number of such extension headers, each identified by a distinct Next Header value. An IPV6 packet may carry zero, one, or more extension headers, each identified by the Next Header field of the preceding header.

Extension headers are part of the IPV6 protocol, and they support some basic functions and certain services. FIG. 9C shows various extension headers (EHs). Now, descriptions are provided of various circumstances where some of these EHs can be used. The Hop-by-Hop EH can be used for the support of Jumbo-grams. Additionally or alternatively, when used with the Router Alert option, the Hop-by-Hop EH can be integrated in the operation of Multicast Listener Discovery (MLD). For example, Router Alert is an integral part in the operations of IPv6 Multicast through Multicast Listener Discovery (MLD) and RSVP for IPV6. The Destination EH can be used in IPV6 Mobility as well as support of certain applications. Routing EH can be used in IPV6 Mobility and in Source Routing. It may be necessary to disable "IPV6 source routing" on routers to protect against distributed denial-of-service (DDOS) attacks. The Fragmentation EH can be used to support communications using fragmented packets (in IPv6. The Mobility EH can be used in support of Mobile IPV6 service. The Authentication EH can be used in a similar format to the IPV4 authentication header, which is defined in RFC-2402, which is hereby incorporated by reference in its entirety. The Encapsulating Security Payload EH is similar in format and use to the IPV4 ESP header defined in RFC-2406, which is hereby incorporated by reference in its entirety. The information following the Encapsulating Security Header (ESH) is encrypted, accordingly, the information following the ESH is inaccessible to intermediary network devices. The ESH can be followed by an additional Destination Options EH and the upper layer datagram.

Figure 10A:
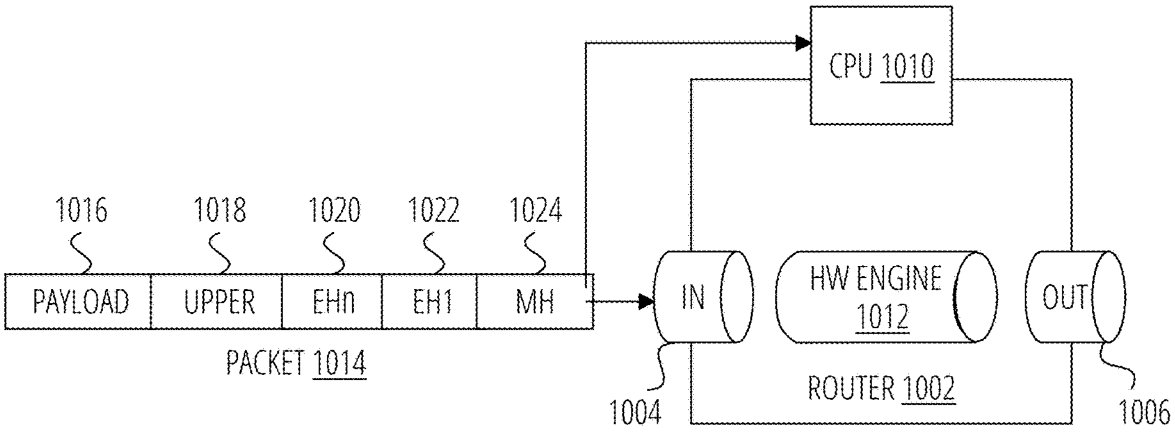
FIG. 10A illustrates a first example of routing IPv6 packets through a router, in accordance with some embodiments.
Figure 10B:
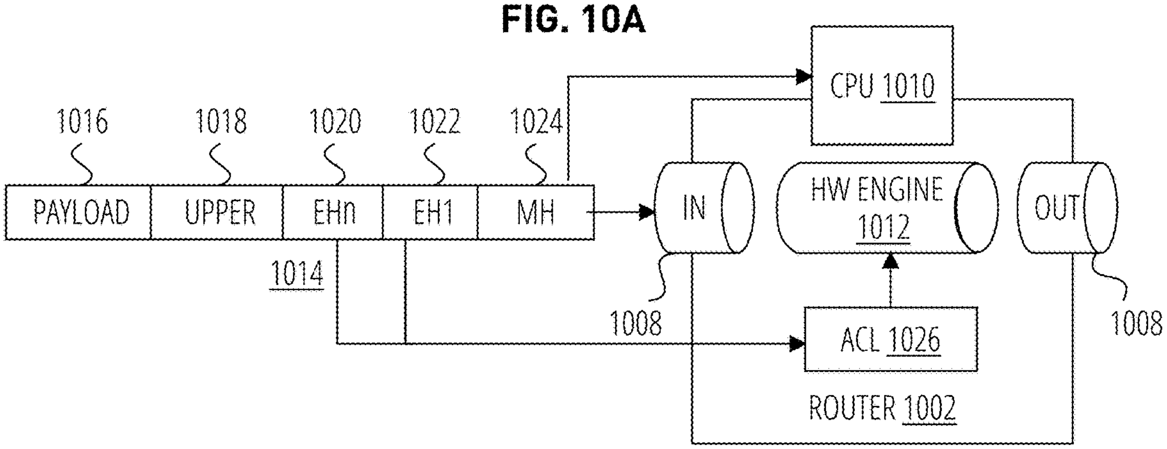
FIG. 10B illustrates a second example of routing IPv6 packets through a router, in accordance with some embodiments.
Figure 10C:
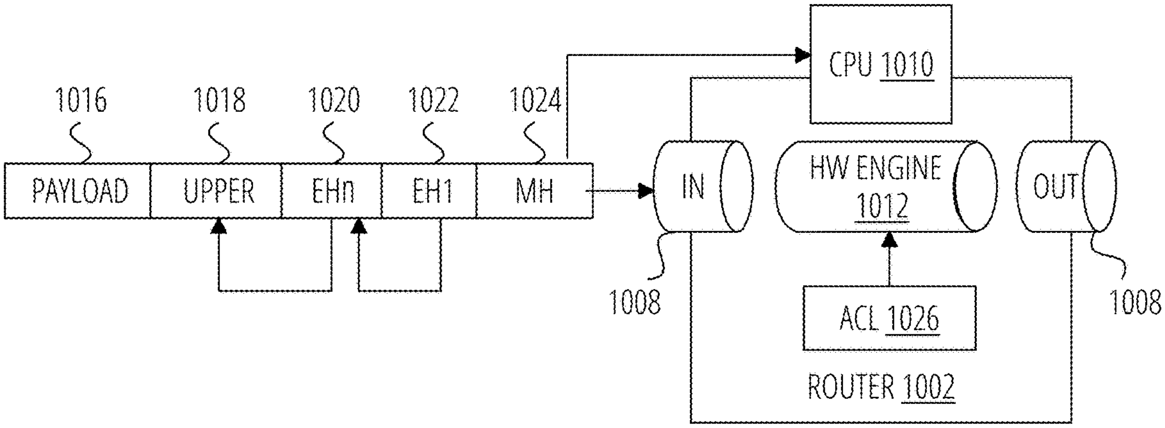
FIG. 10C illustrates a third example of routing IPv6 packets through a router, in accordance with some embodiments.

FIG. 10A through FIG. 10C illustrate the way in which various Extension Header types can be processed by network devices under basic forwarding conditions or in the context of advanced features such as Access Lists. For example, FIG. 10A through FIG. 10C illustrate how metadata can be parsed from an extension header (EH) such that a network component can refer to the prior-security-operations information therein to determine which security actions are to be performed.

In FIG. 10A, the Hop-by-Hop Extension Header is the only EH that is fully processed by all network devices. From this perspective, the Hop-by-Hop EH is similar to the IPV4 options. Because the Hop-by-Hop EH is fully processed, it is handled by the CPU 1010 and the IPV6 traffic that contains a Hop-by-Hop EH will go through a slow forwarding path. This rule applies to all vendors. Hardware (HW) forwarding (e.g., by HW engine 1012) is not used in this case.

Packet 1014 can include a payload 1016, an upper layer 1018, a series of extension headers (e.g., extension header 1 1022, extension header n 1020, and a main header 1024. The packets are received by an ingress port 1004 of router 1002, and then processed/forward by either a hardware (HW) engine 1008 or a CPUs 1010, depending on the structure of packet 1014. The packets are output from egress port 1006 of router 1002.

Network devices are not required to process any of the other IPv6 extension headers when simply forwarding the traffic. For this reason, IPv6 traffic with one or more EHs other than Hop-by-Hop can be forwarded using the HW engine 1012. Network devices might, however, process some EHs if specifically configured to do so while supporting certain services such as IPv6 Mobility.

For example, the extensions headers used to secure the IP communication between two hosts, Authentication and Encapsulating Security Payload Headers, are also ignored by the intermediary network devices while forwarding traffic. These EHs are relevant only to the source and destination of the IP packet. It is important however to remember that all information following the ESH is encrypted and not available for inspection by an intermediary device, if that is required.

FIG. 10B illustrates a non-limiting example of processing data packets using an access list 1026. Here, IPv6 packet 1014 is forwarded using extension headers other than Hop-by-Hop with ACLs filtering based on EH type. The CPU 1010 can see the information in the main header and the access list 1026 can use the EH type information in the extension header 1 1022 and extension header n 1020, for example.

Consider that, in the absence of the Hop-by-Hop EHs, as long as a router is concerned exclusively with layer 3 (L3) information and it is not specifically instructed to process certain EH (for certain services it is supporting), it can forward IPv6 traffic without analyzing the extension headers. An IPV6 packet can have an arbitrary number of EH (other than Hop-by-Hop) and the router would ignore them and simply forward the traffic based on the main header. Under these conditions, routers can forward the IPV6 traffic in hardware despite the EHs. Access Lists (ACL) applied on router interfaces however, can change the router's IPV6 forwarding performance characteristics when extension headers are present. To permit or deny certain types of extension headers, routers are configured with the ACL features listed above to filter based on the "Header Type" value. Since this functionality is implemented through ACLs, platforms that support hardware forwarding when ACLs are applied, will be able to handle the IPV6 traffic with EHs in hardware as well.

FIG. 10C illustrates a non-limiting example of processing data packets using forwarding IPv6 packet 1014 with extension headers other than Hop-by-Hop with ACLs filtering based on protocol information of the upper layer 1018. Often, routers filter traffic based on the upper layer protocol information. In these cases, a router processes the main header of the packet as well as the information in its payload. In the absence of extension headers, routers perform these functions on IPv6 traffic in the same way they do on IPv4 traffic, so the traffic can be forwarded in hardware.

In the presence of extension headers (not Hop-by-Hop), the upper layer protocol information is pushed deeper into the payload of the packet, impacting the packet inspection process. In these cases, the router can traverse the chain of headers (main plus extension headers), header by header until it reaches the upper layer protocol header and the information for the filter. The extension headers are not processed, the router simply looks at the "Next Header" value and the length of the EH in order to understand what header follows and the offset to its beginning.

Figure 11:
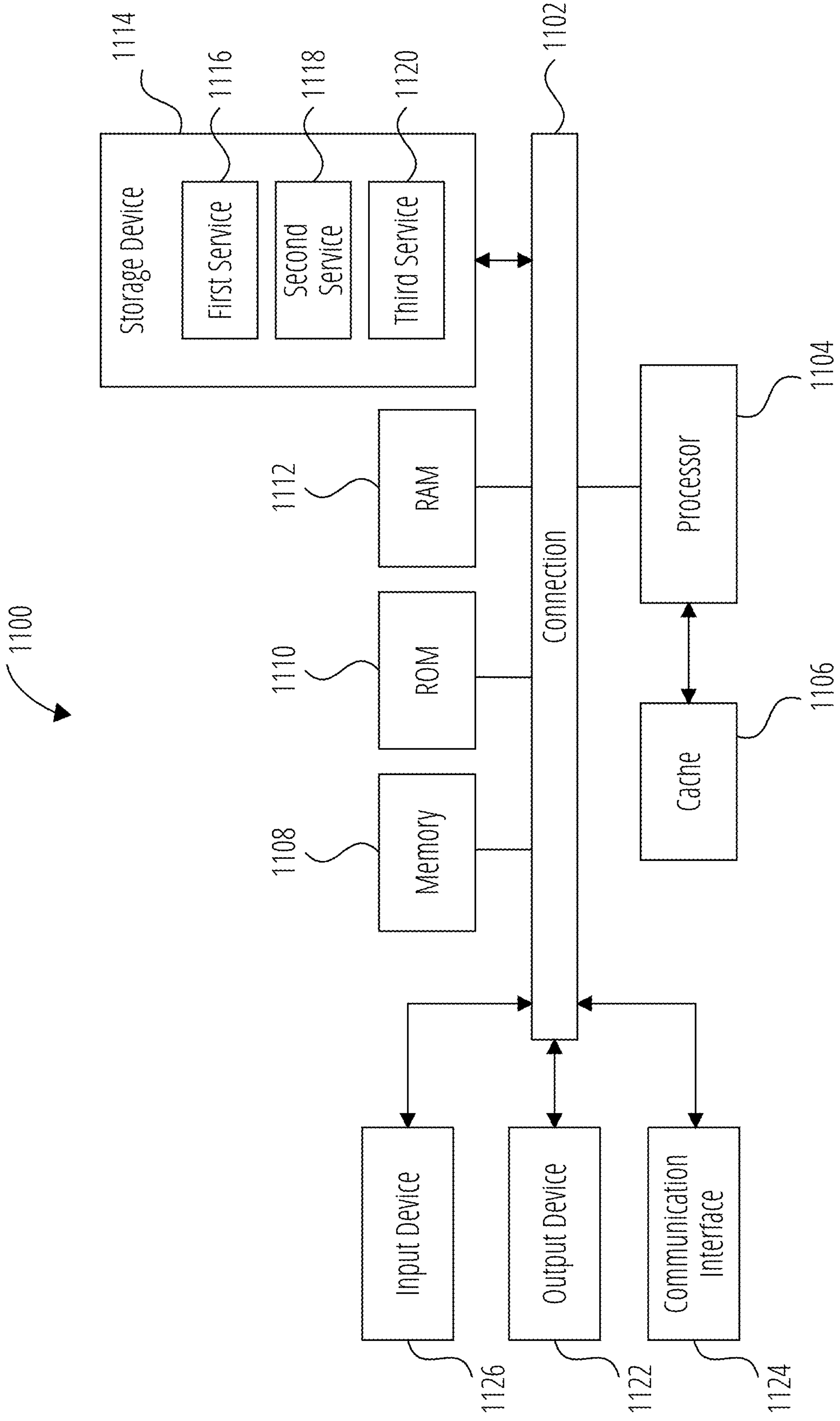
FIG. 11 illustrates a block diagram of an example of a computing device, in accordance with some embodiments.

Even though a router might be able to process upper layer protocol ACLs or one EH in hardware, if it was not designed while considering all aspects of IPV6, it might not be able to handle filtering when packets contain both EH and Upper Layer data as in the scenario described above FIG. 11 shows an example of computing system 1100, which can be for example any computing device making up the system 100, system 300, internet edge security framework 400, data center 500, or any component thereof in which the components of the system are in communication with each other using connection 1102. Connection 1102 can be a physical connection via a bus, or a direct connection into processor 1104, such as in a chipset architecture. Connection 1102 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1100 includes at least one processing unit (CPU or processor) processor 1104 and connection 1102 that couples various system components including system memory 1108, such as read-only memory (ROM) such as ROM 1110 and random access memory (RAM) such as RAM 1112 to processor 1104. Computing system 1100 can include a cache of high-speed memory cache 1106 connected directly with, in close proximity to, or integrated as part of processor 1104.

Processor 1104 can include any general-purpose processor and a hardware service or software service, such as first service 1116, second service 1118, and third service 1120 stored in storage device 1114, configured to control processor 1104 as well as a special-purpose processor where software instructions are incorporated into the actual processor design. The services can be security operations or one or more steps of method 200 in FIG. 2, for example. Processor 1104 may essentially be a completely self-contained computing system, containing multiple cores or processors, a bus, memory controller, cache, etc. A multi-core processor may be symmetric or asymmetric.

To enable user interaction, computing system 1100 includes an input device 1126, which can represent any number of input mechanisms, such as a microphone for speech, a touch-sensitive screen for gesture or graphical input, keyboard, mouse, motion input, speech, etc. Computing system 1100 can also include output device 1122, which can be one or more of a number of output mechanisms known to those of skill in the art. In some instances, multimodal systems can enable a user to provide multiple types of input/output to communicate with computing system 1100. Computing system 1100 can include communication interface 1124, which can generally govern and manage the user input and system output. There is no restriction on operating on any particular hardware arrangement, and therefore the basic features here may easily be substituted for improved hardware or firmware arrangements as they are developed.

Storage device 1114 can be a non-volatile memory device and can be a hard disk or other types of computer-readable media that can store data that are accessible by a computer, such as magnetic cassettes, flash memory cards, solid state memory devices, digital versatile disks, cartridges, random access memories (RAMs), read-only memory (ROM), and/or some combination of these devices.

Storage device 1114 can include software services, servers, services, etc., that when the code that defines such software is executed by the processor 1104, it causes the system to perform a function. In some embodiments, a hardware service that performs a particular function can include the software component stored in a computer-readable medium in connection with the necessary hardware components, such as processor 1104, connection 1102, output device 1122, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a network devices and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, For example, instructions and data that cause or otherwise configure a general-purpose computer, special-purpose computer, or special-purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, For example, instructions and data which cause or otherwise configure a general-purpose computer, special-purpose computer, or special-purpose processing device to perform a certain function or group of functions. Portions of computer resources used can be accessible over a network. The computer executable instructions may be, For example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of processing data flows through policy-enforcement points of a network fabric, the method comprising:

receiving, at a first policy-enforcement point, a data flow comprising data packets and metadata, wherein the metadata comprises one or more cryptographically verifiable attestations of the one or more security operations, the one or more cryptographically verifiable attestations being generated by one or more upstream policy-enforcement points and accompanying the data packets with the data flow; and determining, based on the metadata, which security operations have been performed on which of the data packets of the data flow to generate a determination result including verifying the one or more cryptographically verifiable attestations; and applying, based on the determination result, one or more security actions to the data flow, wherein the one or more security actions comprise performing an additional security operation on a first subset of data packets that require the additional security operation and dropping at least one remaining data packet that also requires the additional security operation, the performing and dropping being based on available processing resources at the first policy-enforcement point.

2. The method of claim 1, further comprising:

parsing the metadata from the data flow; and determining which attestations in the metadata are associated (i) with which of the data packets and (ii) with which predefined security operations.

3. The method of claim 1, wherein the one or more security actions include:

(i) allowing the first subset of data packets through the first policy-enforcement point based on whether the one or more security operations satisfy one or more security criteria, (ii) performing one or more additional security operations on the first subset of data packets when the one or more security operations performed do not satisfy the one or more security criteria, and/or (iii) determining the one or more security criteria upon which the one or more security actions for the first subset of data packets depends, the one or more security criteria being based on a source and/or a destination of the first subset of data packets.

4. The method of claim 1, wherein the one or more security actions include:

determining that the additional security operations is required for the first subset of data packets to be allowed into a workload; and performing the additional security operations on the first subset of data packets and dropping the at least one remaining packet.

5. The method of claim 4, wherein the one or more security actions include:

determining, for future data packets of the data flow, a load balancing that includes a division of the one or more additional security operations between the first policy-enforcement point and upstream nodes of the network fabric that are upstream the data flow from the first policy-enforcement point; and signaling, to the upstream nodes, the division of the one or more additional security operations.

6. The method of claim 1, further comprising:

performing, at the first policy-enforcement point, an other security operation on the data flow; and determining, based on the metadata, that the other security operation is not necessary for the first subset of data packets, wherein:

the one or more security actions includes omitting the first subset of data packets from the data packets on which the first policy-enforcement point performs the other security operation.

7. The method of claim 6, wherein determining that the other security operation is not necessary for the first subset of data packets is based, at least partly, on determining that the other security operation is redundant of the one or more security operations.

8. The method of claim 6, wherein determining that the other security operation is not necessary for the first subset of data packets is based, at least partly, on determining that:

the other security operation is not necessary based on an identity of a user that originated the first subset of data packets, the identity of the user being securely attested to in the metadata, the other security operation is not necessary based on an identity of an application that originated the first subset of data packets, the identity of the application being securely attested to in the metadata, the other security operation is not necessary based on a protocol, a source address, a source port, a destination address, and/or a destination port of the first subset of data packets, and/or the other security operation is not necessary based on a trust zone to which the first policy-enforcement point allows entrance of the data flow.

9. The method of claim 1, further comprising:

determining security vulnerabilities of a workload; and determining security criteria for the workload based on the security vulnerabilities, wherein:

the one or more security actions include determining whether a data packet of the data flow is allowed into the workload based on the metadata indicating that the one or more security operations performed on the data packet satisfy the security criteria.

10. The method of claim 1, wherein the first policy-enforcement point is a firewall, an extended Berkley packet filter (eBPF), a data processing unit (DPU), or program called in response to an operating system (OS) hook.

11. The method of claim 1, wherein the first policy-enforcement point is:

(a) a policy-enforcement point at a boundary of a trust zone, (b) a final policy-enforcement point before a workload, (c) a policy-enforcement point at a tunnel endpoint of an encapsulation protocol or a virtual network, or (d) a policy-enforcement point at a boundary of a network.

12. The method of claim 1, wherein the metadata is added to the data flow by one or more other policy-enforcement points along a path of the data flow, and the one or more other policy-enforcement points include a firewall, an extended Berkley packet filter (eBPF), or a data processing unit (DPU).

13. The method of claim 1, wherein the one or more security operations include a web application firewall (WAF) function, a layer three (L3) firewall function, a layer seven (L7) firewall function, deep packet inspection, anomaly detection, cyber-attack signature detection, packet filtering, or an intrusion prevention system function.

14. The method of claim 1, wherein the metadata is encoded in one or more transport layer security (TLS) extension fields, in one or more headers of Internet protocol (IP) packet, in one or more optional Internet protocol version 6 (IPv6) extension headers, or one or more headers of an encapsulation protocol.

15. A computing apparatus comprising:

a processor;

a memory storing instructions that, when executed by the processor, configure the computing apparatus to:

receive, at a first policy-enforcement point, a data flow comprising data packets and metadata, wherein the metadata comprises one or more cryptographically verifiable attestations of the one or more security operations, the one or more cryptographically verifiable attestations being generated by one or more upstream policy-enforcement points and accompanying the data packets with the data flow;

determine, based on the metadata, which security operations have been performed on which of the data packets of the data flow to generate a determination result including verifying the one or more cryptographically verifiable attestations; and apply, based on the determination result, one or more security actions to the data flow, wherein the one or more security actions comprise performing an additional security operation on a first subset of data packets that require the additional security operation and dropping at least one remaining data packet that also requires the additional security operation, the performing and dropping being based on available processing resources at the first policy-enforcement point.

16. The computing apparatus of claim 15, wherein, when executed by the processor, the instructions further configure the computing apparatus to:

parse the metadata from the data flow; and determine which attestations in the metadata are associated with which of the data packets and which are associated with which predefined security operations.

17. The computing apparatus of claim 15, wherein the one or more security actions include:

(a) allowing the first subset of data packets through the first policy-enforcement point based on whether the one or more security operations satisfy one or more security criteria, (b) performing one or more additional security operations on the first subset of data packets when the one or more security operations performed do not satisfy the one or more security criteria, and/or (c) determining the one or more security criteria upon which the one or more security actions for the first subset of data packets depends, the one or more security criteria being based on a source and/or a destination of the first subset of data packets.

18. The computing apparatus of claim 15, wherein the instructions cause the computing apparatus to apply the one or more security actions to the data flow by configuring the computing apparatus to:

determine that the additional security operations is required for the first subset of data packets to be allowed into a workload; and perform the additional security operations on the first subset of data packets and dropping the at least one remaining packet.

19. The computing apparatus of claim 18, wherein the instructions cause the computing apparatus to apply the one or more security actions to the data flow by configuring the computing apparatus to:

determine, for future data packets of the data flow, a load balancing that includes a division of the one or more additional security operations between the first policy-enforcement point and upstream nodes of a network fabric that are upstream the data flow from the first policy-enforcement point; and signal, to the upstream nodes, the division of the one or more additional security operations.

20. The computing apparatus of claim 15, wherein, when executed by the processor, the instructions further configure the computing apparatus to:

perform, at the first policy-enforcement point, other security operation on the data flow; and determine, based on the metadata, that the other security operation is not necessary for the first subset of data packets, wherein the one or more security actions includes omitting the first subset of data packets from the data packets on which the first policy-enforcement point performs the other security operation.

* * * * *